Oct. 4, 1966 J. D. FREEMAN 3,276,200

ELECTRONIC CLOCK

Filed Aug. 27, 1964 11 Sheets-Sheet 1

INVENTOR.
JOHN D. FREEMAN
BY
Louis Altman
ATTY.

INVENTOR
JOHN D. FREEMAN
by: Louis Altman
ATTY.

Oct. 4, 1966 J. D. FREEMAN 3,276,200

ELECTRONIC CLOCK

Filed Aug. 27, 1964 11 Sheets-Sheet 3

INVENTOR.
JOHN D. FREEMAN
BY Louis Altman
ATTY.

INVENTOR.
JOHN D. FREEMAN
BY Louis Altman
ATTY.

Oct. 4, 1966 J. D. FREEMAN 3,276,200

ELECTRONIC CLOCK

Filed Aug. 27, 1964 11 Sheets-Sheet 5

INVENTOR.
JOHN D. FREEMAN
BY Louis Altman
ATTY.

Oct. 4, 1966 J. D. FREEMAN 3,276,200

ELECTRONIC CLOCK

Filed Aug. 27, 1964 11 Sheets-Sheet 6

INVENTOR.
JOHN D. FREEMAN
BY Louis Altman
ATTY.

INVENTOR.
JOHN D. FREEMAN
BY
Louis Altman
ATTY.

ELECTRONIC CLOCK

Filed Aug. 27, 1964 11 Sheets-Sheet 8

INVENTOR.
JOHN D. FREEMAN
BY Louis Altman
ATTY.

INVENTOR.
JOHN D. FREEMAN
BY Louis Altman
ATTY.

Oct. 4, 1966 J. D. FREEMAN 3,276,200

ELECTRONIC CLOCK

Filed Aug. 27, 1964 11 Sheets-Sheet 10

INVENTOR.
JOHN D. FREEMAN
BY Louis Altman
ATTY.

Oct. 4, 1966 J. D. FREEMAN 3,276,200

ELECTRONIC CLOCK

Filed Aug. 27, 1964 11 Sheets-Sheet 11

INVENTOR.
JOHN D. FREEMAN
BY Louis Altman
ATTY.

3,276,200
Patented Oct. 4, 1966

3,276,200

ELECTRONIC CLOCK

John D. Freeman, Westport, Conn., assignor to General Time Corporation, New York, N.Y., a corporation of Delaware Filed Aug. 27, 1964, Ser. No. 392,496
17 Claims. (Cl. 58—50)

The present invention relates to an electronic clock, and more specifically to a solid state clock including electro-luminescent panels oriented at positions on a clock face corresponding to the positions of the clock hands which are selectively illuminated to indicate the time.

A primary object of this invention is to provide a new and improved clock having no moving parts which has little thickness and which may be readily applied to a flat wall. Another object is to provide such a solid state clock characterized by accuracy, stability and long life and which is particularly susceptible to being made in large size to produce a spectacular, eye-catching display for advertising and promotional purposes.

More specifically, an object of this invention is to provide a solid state clock utilizing a plurality of electroluminescent panels or rods which, for example, are radially oriented on a circular clock face at positions corresponding to positions of the clock hands, which are selectively illuminated to indicate the time, and which may be readily seen either in the dark or under normal conditions of illumination. Further along these lines, an object of this invention is to provide a solid state clock of this type wherein electroluminescent panels or rods are provided which are positioned at "minute" intervals on the clock face.

A still more specific object of the present invention is to provide a solid state clock including a lumped parameter electromagnetic delay line having a plurality of electroluminescent panels connected thereto characterized in that input pulses are applied to opposite ends of the delay line with desired time relationships therebetween so that selected electroluminescent panels are illuminated in response to the coincidence of input pulses indicating the positions of the clock hands. A related object is to provide a solid state clock of this type characterized in that the time relationships between the applications of input pulses are varied according to a time function so that succeeding ones of the electroluminescent panels are controllably illuminated, indicating the movements of the clock hands. A further object of this invention is to provide a solid state clock of this type wherein the pulses are applied at a rate such that the selected electroluminescent panels appear to remain illuminated throughout the period during which pulses coincide. Another object of the present invention is to provide a solid state clock of this type characterized in that an entire electroluminescent panel is illuminated to indicate the position of the minute hand and characterized in that only a portion of an electroluminescent panel is illuminated to indicate the position of the hour hand.

An additional object of this invention is to provide a solid state clock utilizing a delay line wherein one end of the delay line is open-ended and input pulses are applied to the opposite end of the delay line with a prescribed time relationship therebetween characterized in that an electroluminescent panel is illuminated to indicate a clock hand position in response to coincidence between one input pulse and the reflection of an earlier input pulse.

Another object of this invention is to provide a new and improved delay line employing elements having nonlinear characteristics. More specifically, an object is to provide a delay line employing electroluminescent panels and nonlinear resistive elements connected in series.

Other objects and advantages of this invention will become apparent upon reading the attached detailed description and upon reference to the drawings in which.

While the invention has been described in connection with certain preferred embodiments, it is to be understood that the invention is not to be limted to the disclosed embodiments but, on the contrary, the invention is intended to cover the various modifications and equivalent arrangements included within the spirit and scope of the appended claims.

Figures 1, 2, 3:
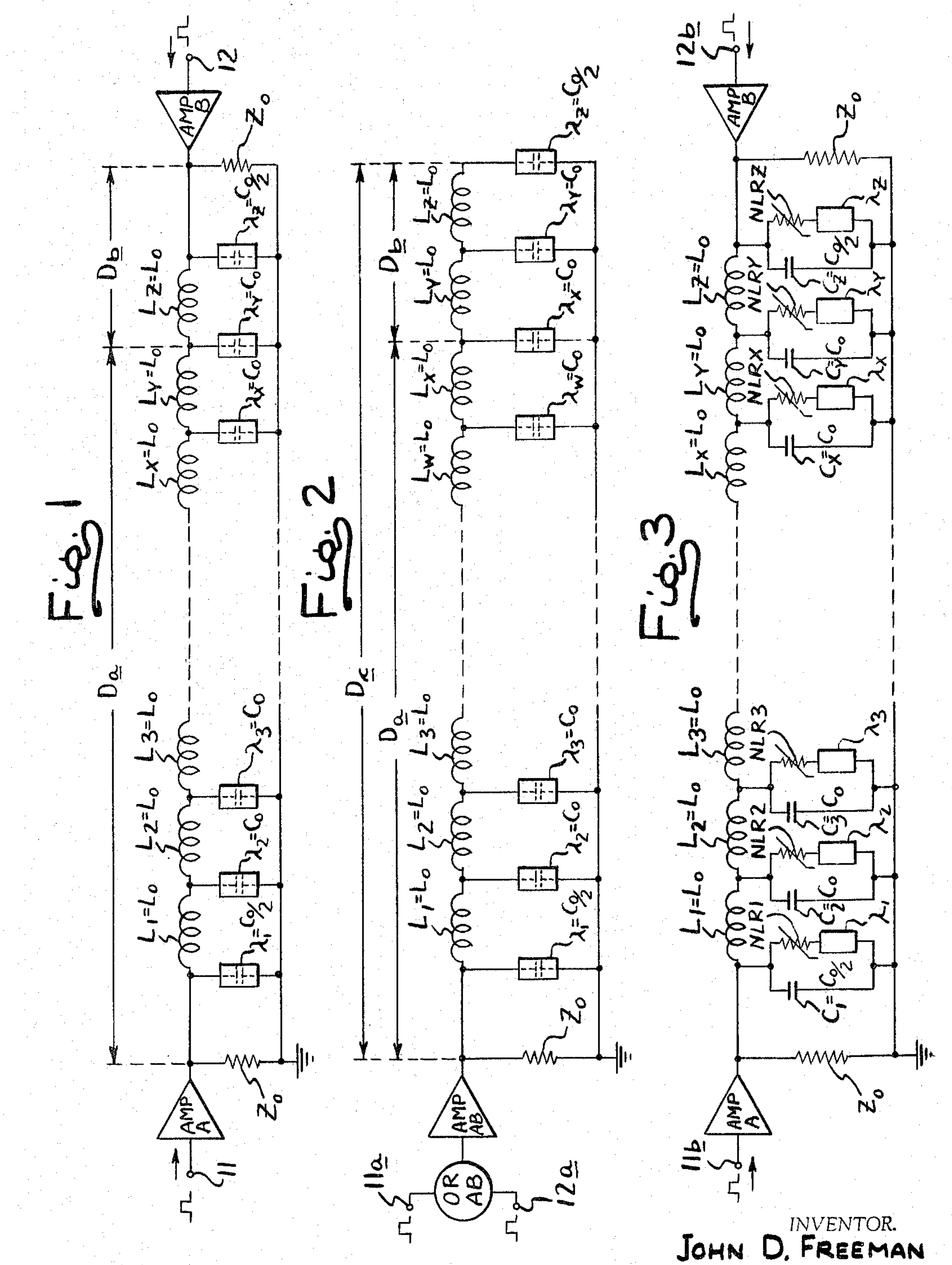
FIGURE 1 is a schematic diagram of a lumped parameter electromagnetic delay line having a plurality of electroluminescent panels associated therewith wherein input pulses are applied to opposite ends of the delay line.
FIG. 2 is a schematic diagram similar to FIG. 1 wherein the delay line is open-ended and input pulses are applied to a common end of the delay line.
FIG. 3 is a schematic diagram similar to FIG. 1 wherein nonlinear resistive elements are connected in series with the electroluminescent panels and fixed capacitors are connected across the series arrangements of the electroluminescent panels and the nonlinear resistance elements.

Referring to FIGURE 1, a lumped parameter electromagnetic delay line is illustrated having inputs 11 and 12 at opposite ends thereof. The delay line includes a plurality of electroluminescent panels $\lambda_1$–$\lambda_z$ which function as capacitances as indicated by the dotted capacitance symbols in the panel representing blocks. The electroluminescent panels are electrically connected together by inductances $L_1$–$L_z$ which have the same inductance values. If a different input pulse is applied to each of the input terminals 11 and 12 and a desired time relationship exists between the times of application of such input pulses, a selected electroluminescent panel is illuminated upon coincidence of the input pulses thereadjacent. Input pulses applied to the input terminal 11 are transmitted to the delay line through an amplifier AMPA, and the terminal portion of the delay line associated therewith includes an input resistance $Z_0$. Likewise, input pulses applied to the input terminal 12 are transmitted to the delay line through an amplifier AMPB, and the terminal portion of the delay line associated therewith also includes an input resistance designated as $Z_0$. $Z_0$ is the characteristic impedance of the delay line, and its presence at each end of the delay line serves to prevent the reflection of a pulse after it has traversed the length of the delay line. This is required to avoid undesired coincidence with reflected pulses, as will become apparent.

The delay line has a plurality of sections which may be characterized as $\pi$ sections. Each section includes an inductor L having a capacitor in the form of an electroluminescent panel connected to each end thereof. For example, the second section from the left, as viewed in FIGURE 1, includes an inductor $L_2$ having identical panels $\lambda_2$ and $\lambda_3$ connected to opposite ends thereof. The panel $\lambda_2$ also forms a part of the first section, whereas the panel $\lambda_3$ also forms a part of the third section. Since the panels $\lambda_2$ and $\lambda_3$ are shared by adjacent sections, the effective capacitance thereof in each adjacent section is one-half the total capacitance. In like manner, the remaining panels, except for panels $\lambda_1$ and $\lambda_z$, are shared by adjacent sections. Accordingly, if the panels $\lambda_1$ and $\lambda_z$ are selected to have values of $C_{0/2}$, whereas the remaining panels are selected to have values of $C_0$, the delay of each section will be equal.

Since the details of the operation of a lumped parameter delay line are known in the art, they will not be set forth herein. Suffice it to say that the amplitudes of the input pulses are below the voltage levels required to produce discernible illumination of the electroluminescent panels and that, upon coincidence adjacent a panel of input pulses applied to opposite ends of the delay line, the input pulses add up to a voltage level which sufficiently energizes the panel to generate a discernible level of illumination. For example, let it be assumed that it is desired to illuminate the electroluminescent panel $\lambda_y$ in FIG. 1. Accordingly, coincidence of the input pulses applied to opposite ends of the delay line must occur adjacent the electroluminescent panel $\lambda_y$. It may be seen that, for coincidence to occur adjacent panel $\lambda_y$, an input pulse applied to the input terminal 11 must travel along the delay line a distance designated as $D_a$, whereas an input pulse applied to the input terminal 12 must travel along the delay line only a distance designated as $D_b$. It follows that, to illuminate panel $\lambda_y$, an input pulse applied to the input terminal 11 must be applied thereto a prescribed time period before a corresponding input pulse is applied to the input terminal 12, such a time period being equal to the time required for the pulse applied to the input terminal 11 to travel along the delay line a distance equal to $D_a$–$D_b$. For the details of the operation of a lumped parameter delay line utilizing electroluminescent panels as capacitive elements, reference may be made to the article "Electroluminescent Display Presents Nanosecond Pulses" by R. W. Windebank, in the December 8, 1961, issue of the Electronics magazine, published by McGraw-Hill Publishing Company, Inc., of New York, N.Y.

In the operation of the delay line illustrated in FIG. 1, it will be apparent that, if input pulses are simultaneously applied to opposite ends of the delay line, coincidence will occur midway between the ends of the delay line. For a panel to be connected in the delay line at this point, an odd number of panels must be utilized. Accordingly, the present invention contemplates the utilization of an odd number of panels so that input pulses may be simultaneously applied to opposite ends of the delay line.

Though in the above-described delay line of FIG. 1 input pulses are applied to the opposite ends of the delay line, it is to be understood that the same results may be accomplished by applying a pair of input pulses to the same end of an open-ended delay line with a desired time relationship therebetween. In this latter case, an electroluminescent panel is illuminated in response to the coincidence thereadjacent of an input pulse and the reflection of a previously applied input pulse. Such a delay line arrangement is illustrated in FIG. 2 wherein a pair of input terminals 11*a* and 12*a* are associated with a delay line similar to that illustrated in FIG. 1, but having one end thereof terminating in an infinite impedance. Input pulses applied to terminals 11*a* and 12*a* are transmitted to the delay line through an OR gate ORAB and an amplifier AMPAB. Again, the details of operation of this delay line are known and, therefore, they will not be set forth herein. Suffice it to say that an electroluminescent panel is illuminated when coincidence occurs thereadjacent between one of the input pulses and the reflection of an earlier applied input pulse. For example, let it again be assumed that it is desired for the electroluminescent panel $\lambda_y$ to be illuminated. For this purpose, an input pulse must be applied to one of the input terminals, for instance terminal 11*a*, a prescribed time period before an input pulse is applied to the other input terminal 12*a*. It follows that such a time period is equal to the time required for the pulse applied to terminal 11*a* to travel along the delay line a distance equal to the entire length of the delay line, designated as $D_c$, plus the time required for the same pulse to travel from the reflecting end to the desired panel, designated as $D_b$, less the time required for the pulse applied to terminal 12*a* to travel from the input end to the desired panel, a distance designated as $D_a$. Thus, the time period is equal to the time required for a pulse to travel along the delay line a distance equal to $D_c+D_b-D_a$ which, as may readily be seen by reference to FIG. 2, is equal to $2D_b$.

The characteristics of lumped parameter delay lines give rise to various problems in the operation of the present device. If a square input pulse is applied to one end of such a delay line, the pulse is distorted as it travels down the delay line. As a result, the rise time and, therefore, the overall width of the pulse are increased, whereas the pulse amplitude is descreased. In order for the coincidence of two such input pulses to illuminate a single electroluminescent panel without affecting adjacent panels, the distortion of the delay line must be minimized or means must be provided which allows for sharp discrimination between the coincident pulse voltage peak and lower voltage levels.

Figure 1A:
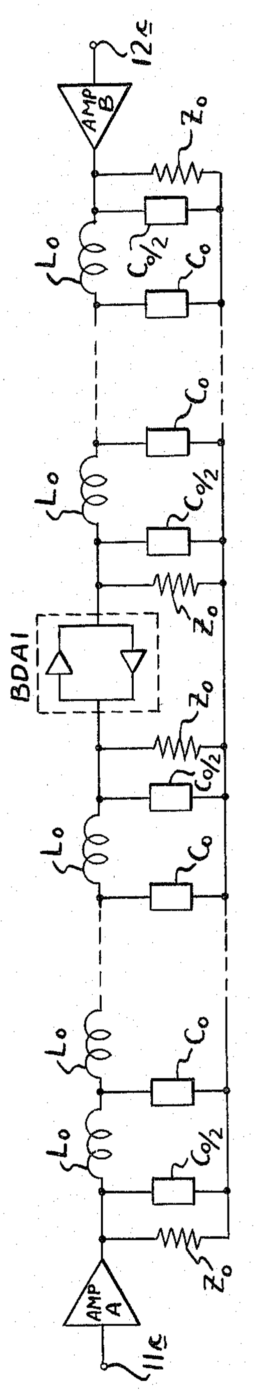
FIG. 1A is a schematic diagram of a modified form of the delay line shown in FIG. 1.

Referring to FIG. 1A, a modification of the delay line shown in FIG. 1 is illustrated which allows for a decrease in input pulse distortion and attenuation. This prevents illumination of panels adjacent the panel whereat pulse coincidence occurs. As may be seen, the modified delay line is actually divided into two separate delay lines which are isolated by a bidirectional amplifier BDA1. The two separate delay lines have equal numbers of sections which are equal to one-half the number of sections in the delay line of FIG. 1. Generally speaking, the delay line in FIG. 1A functions similar to the delay line in FIG. 1. However, a pulse applied to one end of the delay line travels toward the amplifier BDA1 which amplifies and reshapes the pulse and then applies it to the second delay line portion. Since the pulse travels only one-half the length of the total delay line before being amplified and reshaped, the distortion thereof is reduced. The amplifier BDA1 may consist of a pair of monostable multivibrators or blocking oscillators having diodes provided at the input and output terminals for properly steering pulses traveling in the two directions. It will be readily apparent that the delay line may be separated into a greater number of portions by the addition of more bidirectional amplifiers. This would result in an even greater reduction in distortion.

In addition to the problems arising from delay line distortion, the characteristics of electroluminescent materials have given rise to various problems in the operation of the above-described delay lines. Due to the changes in capacitance and dissipation of the electroluminescent elements as the operating life increases and the environmental conditions change, instability of the total delay line and the delay per section of the line have been found to arise. Additionally, it has been found that there often is insufficient contrast between the partially energized electroluminescent panels and the fully energized electroluminescent panels which amplifies the problem of discrimination resulting from the above-described delay line distortion. This contrast is a function of the discrimination ratio of the electroluminescent material and, with the above-described delay line arrangements, it has often been found that this discrimination ratio is insufficient to allow for sufficient contrast between the illuminations of the panels. Finally, limited life of the electroluminescent units results due to the fact that the pulses must be applied to the delay line at a high frequency in order to obtain sufficient illumination, pulses occurring at a given electroluminescent panel causing deterioration thereof even when there is no coincidence.

For a more detailed description of problems encountered in the use of electroluminescent panels, along with a description of the use of nonlinear resistors for combatting such problems, reference may be made to the article "Nonlinear Resistors Enhance Display Panel Contrast," by H. G. Blank, J. A. O'Connell, and M. S. Wasserman, in the August 3, 1963, issue of the Electronics magazine. However, no reference is made therein to overcoming such problems in a delay line.

In accordance with an aspect of the present invention, means are added to the delay line to eliminate or greatly reduce the cumulative problem arising from the characteristics of the delay line and the electroluminescent materials. More specifically, nonlinear resistance elements are connected in series with the electroluminescent panels and fixed capacitors are connected in parallel with the series arrangements of the electroluminescent panels and the nonlinear resistance elements. Referring to FIG. 3, a delay line similar to that shown in FIG. 1 is illustrated, having a pair of inputs **11*b* and 12*b***. However, in this delay line arrangement, nonlinear resistance elements $NLR_1$–$NLR_z$ are connected in series with the electroluminescent panels $\lambda_1$–$\lambda_z$ and fixed capacitors $C_1$–$C_z$ are connected in parallel with the series arrangements of nonlinear resistance elements and electroluminescent panels.

The nonlinear resistance elements are constructed of material such that the resistance thereof is very high when a single input pulse appears thereadjacent, whereas the resistance is several orders of magnitude lower when a pair of input pulses coincide thereadjacent. As a result, for all non-illuminated sections the variable capacitances $\lambda$ are isolated by a high value of nonlinear resistance, and their delay per section therefore depends almost entirely on the stable magnitudes of the inductances $L_1$–$L_z$ and capacitances $C_1$–$C_z$. At the one section where coincidence occurs, the time delay is affected by a lower value of the nonlinear resistance element NLR and the variable capacitance of the panel $\lambda$. But by that time illumination has already occurred; hence it is too late to introduce any error into the time of illumination of that panel. Thus the total delay of the line until illumination occurs is almost independent of variations in the electroluminescent matetrial of the panels.

The nonlinear resistances also greatly increase the ratio of the voltage across an illuminated EL panel to that across a nonilluminated one. Thus the nonlinear resistance elements allow a higher illumination discrimination ratio, so that non-illuminated panels are more nearly "off." Since the voltage across a non-illuminated panel is decreased, this also makes for increased electroluminescent panel life.

Figure 4:
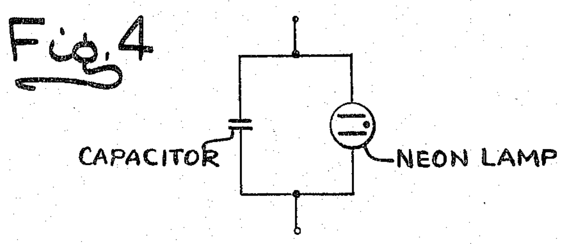
FIG. 4 shows the parallel arrangement of a neon lamp and a capacitor which may be utilized in the delay line of FIG. 3.

With this latter arrangement, the capacitance values for the electroluminescent panels will be insignificant due to the fact that the fixed capacitors $C_1$–$C_z$ are larger and are connected in parallel therewith so that the less reliable capacitances of the panels are "swamped-out" thereby. Accordingly, the elements need not be electroluminescent panels but rather may be any elements, for example incandescent lamps, which will be illuminated in response to the application of prescribed voltages thereacross. Accordingly, the elements $\lambda_1$–$\lambda_z$, in this arrangement, are intended to represent any desired elements capable of illumination under such conditions. Additionally, if the substituted illumination elements have nonlinear characteristics (neon lamps, for example having such characteristics) then the nonlinear resistance elements $NLR_1$–$NLR_z$ may be omitted and the elements would be connected directly in parallel with the capacitors $C_1$–$C_z$, such a parallel arrangement of a capacitor and a neon lamp being illustrated in FIG. 4. The parallel arrangements such as shown in FIG. 4 are intended to be substituted for the parallel arrangements of capacitors, panels and nonlinear resistors in the delay line of FIG. 3. Under such conditions, the capacitors in the first and last parallel arrangements will have values of $C_{0/2}$, whereas the remaining capacitors will have values of $C_0$. In a clock of this type the neon lamps might illuminate ground glass panels to simulate the clock hands.

Though the delay line in FIG. 3 is a modification of the double-ended delay line in FIG. 1, it will be apparent that the single-ended delay line in FIG. 2 may be modified in like manner.

In accordance with a feature of the present invention, a solid state clock is provided utilizing the principles of the above-described delay lines. More specifically, the electroluminescent panels of a lumped parameter electromagnetic delay line are positioned in an array corresponding to the positions of clock hands, and input pulses are applied to the delay line with prescribed time relationships therebetween so that desired electroluminescent panels are illuminated indicating the positions of clock hands. The time relationships between the applications of input pulses are varied according to different time functions so that the electroluminescent panels are controllably illuminated and a running visual indication of the time is provided.

Figure 5:
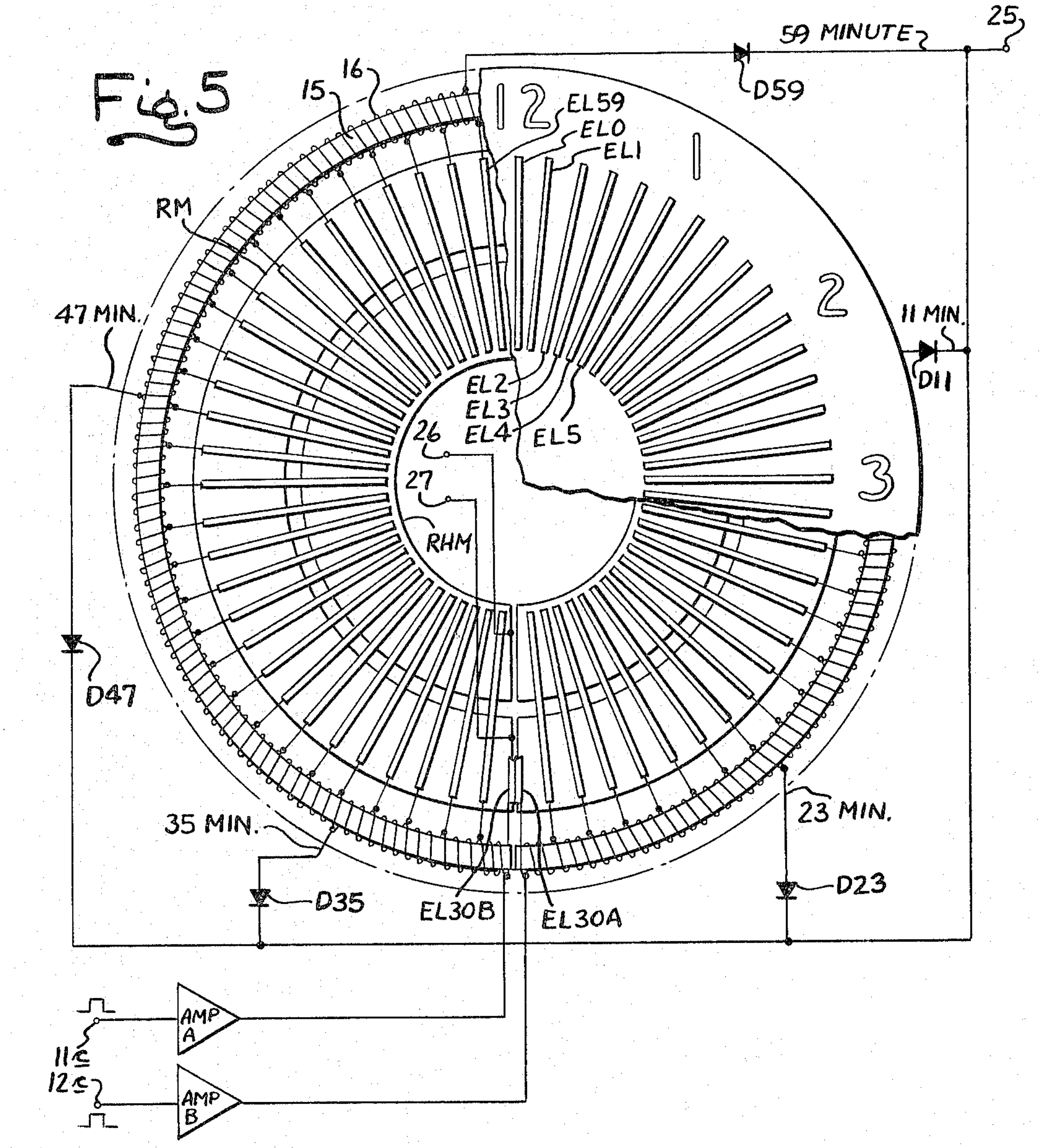
FIG. 5 is a partially cut-away view of the face of a clock illustrating the positions of the electroluminescent panels thereon which are connected in a lumped parameter delay line.
Figure 6:
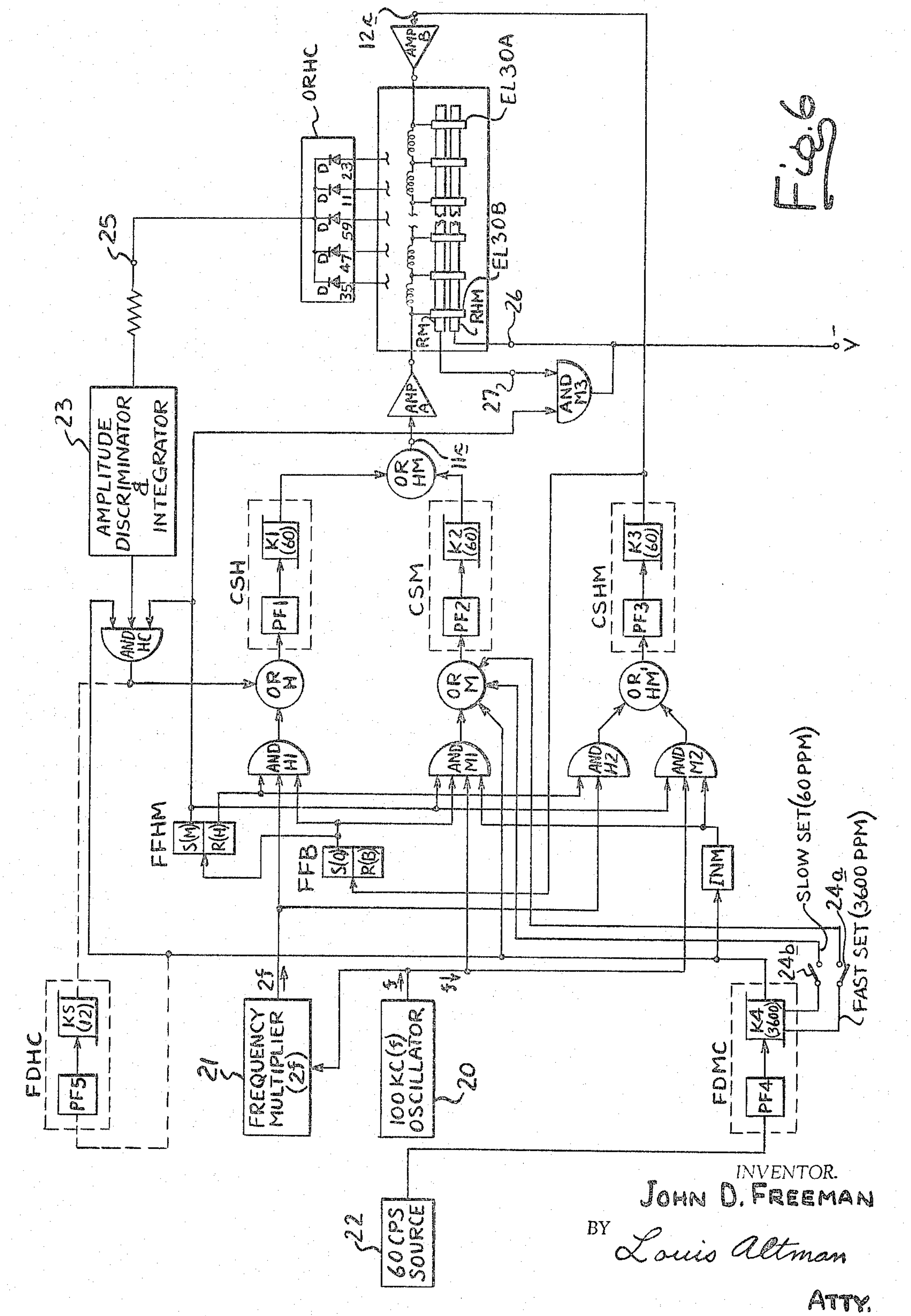
FIG. 6 is a block diagram of an exemplary solid state clock constructed in accordance with the present invention including circuitry for applying pulses to opposite ends of the delay line of the clock.

This feature of the present invention is illustrated in FIGS. 5 and 6 with a delay line corresponding to that shown in FIG. 1. However, it is to be understood that the invention is intended to cover the use of any of the above-described delay lines (FIGS. 1–3) or equivalent arrangements thereof in a solid state clock. As previously discussed, an odd number of panels are utilized so that the central panel, i.e., the panel midway between opposite ends of the delay line, is illuminated when input pulses are simultaneously applied to opposite ends of the delay line. In the exemplary arrangement, sixty-one (61) transparent, conductive panels or rods $EL_0$–$EL_{30A}$ and $EL_{30B}$–$EL_{59}$, subsequently referred to as $EL_0$–$EL_{59}$, are positioned at minute intervals on a clock face. It will be apparent as the description proceeds that, without this odd number of panels, the disclosed solid state clock would not function correctly.

A partially cutaway view of a conventional, circular clock face is shown in FIG. 5 for purposes of illustration. Thus, the panels are arranged radially on the clock face in a circular array at positions corresponding to the minute positions of the clock hands. However, it is to be understood that the invention is readily adaptable for use with other conventional or nonconventional clock face arrangements, such as a linear clock face, and the invention is intended to cover all such arrangements. As may be seen, only selected panels in FIG. 5 have been given reference numerals, though all the panels are to be considered as being sequentially numbered from 0–30A and 30B–59. Each of the panel $EL_0$–$EL_{59}$ functions as one plate of a capacitor in a delay line and a pair of continuous, circular conductive rings RM and RHM are mounted below the panels in axially spaced overlapping relationship to function as the other plates of the capacitors. The inductive portion of the delay line consists of windings 16 on an air core 15, the electroluminescent panels being electrically connected to the winding 16 at equally spaced positions around the core 15 such that equal inductances are provided therebetween. An air core is utilized rather than a common ferromagnetic core to substantially limit or eliminate mutual inductance which would effect operation of the delay line or the clock. Additionally, where a greater inductance is required, individual ferromagnetic cores may be utilized, provided they are spaced or shielded so that mutual inductance is substantially limited or eliminated. As will become apparent later, the two conductive rings RM and RHM have been provided so that, when both rings are connected in the circuit substantially an entire electroluminescent panel is illuminated to indicate the position of the minute hand, whereas when only the ring RHM is connected in the circuit, a lesser portion of an electroluminescent panel is illuminated to indicate the position of the hour hand.

In the illustrated embodiment, the panels $EL_0$–$EL_{59}$ are considered to be electroluminescent panels and, accordingly, the electroluminescent phosphors are considered to be coated thereon. However, since the panels are transparent, the illuminated phosphors will be visible therethrough so that the phosphors may be coated on the facing surfaces of either the panels $EL_0$–$EL_{59}$ or the conductive rings RM and RHM. Additionally, the phosphor coating may be continuous or may be applied only to the areas whereat the panels and the rings physically overlap since, in either case, only the overlapping areas will be illuminated.

Since there are sixty-one (61) panels, it will be apparent that the delay line illustrated in FIG. 5 includes one more panel than there are minute positions on a clock face. To overcome this problem, panels $EL_{30A}$ and $EL_{30B}$ have been ganged together to appear as a single panel representative of the thirty (30) minute position, these panels being concurrently illuminated as will become apparent. Alternatively, one of these panels $EL_{30A}$ or $EL_{30B}$ could be blanked out or an impedance element not having illumination characteristics could be connected in the delay line in lieu thereof.

In keeping with this feature of the present invention, circuitry is provided for applying pulses to opposite ends of the delay line so that the electroluminescent panels therein are selectably illuminated in accordance with the desired positions of the clock hands. Referring to FIG. 6, circuitry is illustrated for applying "minute" input pulses to opposite ends of the delay line through amplifiers AMPA and AMPB and for electrically associating both of the rings RM and RHM with the electroluminescent panels $EL_0$–$EL_{59}$ so that substantially the entire electroluminescent panels are controllably illuminated in accordance with the positions of the minute hand. Additionally, circuitry is illustrated for applying "hour" input pulses to opposite ends of the delay line through the amplifiers and for electrically associating only the ring RHM with the electroluminescent panels $EL_0$–$EL_{59}$ so that only the lower portions of the electroluminescent panels are controllably illuminated in accordance with the positions of the hour hand. The clock in FIG. 6 has, for the sake of simplicity, been illustrated in linear form rather than circular form as shown in FIG. 5.

Throughout the remainder of the description, the designation "H" refers to circuitry for controlling the position of the hour hand, the designation "M" refers to circuitry for controlling the position of the minute hand, and the designation "HM" refers to common circuitry for controlling the positions of both the hour and minute hands.

For the purpose of applying pulses to the left-hand input terminal in FIG. 6, designated as terminal 11*c*, counter storage units CSH and CSM are provided which are connected to the terminal 11*c* through an OR gate ORHM and which may respectively be referred to as the "hour" counter storage unit and the "minute" counter storage unit. Each counter storage unit may be any known device having an input and an output which responds to the application of input pulses thereto to store a count therein until a prescribed total count is attained, which provides an output pulse when the prescribed total count is attained, and which restores itself to an initial condition upon the total count being attained so that input pulses may again be applied thereto. In the exemplary arrangement, the "hour" storage unit CSH includes a pulse former PF1 and a magnetic counter K1 and similarly the "minute" storage unit CSM includes a pulse former PF2 and a magnetic counter K2. The pulse formers PF1 and PF2 are designed to produce output pulses having desired constant volt-second contents in response to the application of input pulses thereto so that, as will be apparent, the magnetic counters respond more accurately to the input pulses. For the desired operation, the counters K1 and K2 are designed to provide an output pulse in response to the application thereto of sixty (60) input pulses, i.e., the counters are "60" counters.

For the purpose of applying pulses to the right-hand input terminal, designated as 12*c*, a third counter storage unit CSHM is provided which may be referred to as the "hour-minute" counter storage unit. This storage unit is substantially identical to the storage units CSH and CSM and, likewise, may include a pulse former PF3 which provides an output pulse having a constant volt-second content in response to each input pulse applied thereto and a magnetic counter K3 which also is a "60" counter.

Hereinafter, pulses applied to opposite ends of the delay line, during a given interval of time, by storage units CSH and CSHM will be referred to as "hour" input pulses and pulses applied thereto, during a given interval of time, by storage units CSM and CSHM will be referred to as "minute" input pulses.

An oscillator 20, having an output frequency $f$, has been provided for supplying pulses to the storage units. The output of the oscillator 20 is connected to the input of the "minute" storage unit CSM through gates ANDM1 and ORM so that, when the gate ANDM1 is open, input pulses are applied to the storage unit CSM at a frequency of $f$. Likewise, the output of the oscillator 20 is connected to the input of the "hour-minute" storage unit CSHM through gates ANDM2 and ORHM' so that, when the gate ANDM2 is enabled, input pulses are likewise applied to the storage unit CSHM at a frequency of $f$.

As previously mentioned, only the conductive ring RHM is associated with the electroluminescent panels when "hour" pulses are applied to the opposite ends of the delay line, whereas both conductive rings RM and RHM are associated with the electroluminescent panels when "minute" input pulses are applied to opposite ends of the delay line. The delay per section of the delay line is approximately proportional to the square root of LC for a selected section. Accordingly, if the delay line is to be constructed so that the delay per section during the application of hour pulses is to be one-half the delay per section during the application of minute pulses, then the total conductive ring area associated with a panel during "minute" operation (i.e. both rings) must be four times the conductive ring area associated with the panel during "hour" operation (ring RHM only). This means that the area of the ring RM must be three times the area of the ring RHM. To compensate for the cutting in half of the delay per section, the time period between the application of pairs of "hour" pulses to the delay line must be one-half the time period between the application of corresponding pairs of "minute" input pulses to the delay line. The time period may be readily cut in half by applying input pulses to the storage units CSH and CSHM at twice the frequency at which input pulses are applied to the storage units CSM and CSHM. To accomplish this frequency doubling in the illustrated embodiment, the output of the oscillator 20 is connected to a frequency multiplier 21 which, in this instance, is a frequency doubler and which thus provides an output having a frequency of $2f$. The output of the frequency multiplier 21 is, in turn, connected to the input of the storage unit CSH through gates ANDH1 and ORH so that, when the gate ANDH1 is enabled, input pulses are applied to the storage unit CSHM through gates ANDH2 and ORHM' so that, when the gate ANDH2 is enabled, input pulses are applied to the storage unit CSHM at a frequency of $2f$.

In the exemplary embodiment, the oscillator 20 is assumed to be a 100 kc. oscillator. Consequently, when the oscillator 20 applies pulses to the circuit, pulses are applied to the electroluminescent panels at a rate of 100 kc./60 so that the panels are adequately illuminated for daytime viewing. It follows, then, that a 200 kc. output is provided by the frequency multiplier 21 and, when pulses are applied thereby to the circuit, pulses are applied to the panels at a rate of 200 kc./60.

In view of the foregoing, it will be apparent that if the gates ANDM1 and ANDM2 are concurrently enabled, "minute" input pulses will be applied to opposite ends of the delay line by the storge units CSM and CSHM. Likewise, if the gates ANDH1 and ANDH2 are concurrently open, "hour" input pulses will be applied to opposite ends of the delay line by the storage units CSH and CSHM. In order to control the operation of the gates ANDH1, ANDH2, ANDM1 and ANDM2 so that "hour" and "minute" input pulses are not simultaneously applied to the delay line but rather are alternately applied thereto, a flip-flop FFHM is provided. Additionally, a "blanking" flip-flop FFB is provided for controlling the operation of the flip-flop FFHM and the gates ANDH1 and ANDM1 so that, following the application of each pair of "minute" pulses or "hour" pulses to the delay line, there is a "blank" period during which no input pulses are applied to the delay line. The "blank" period is provided to allow time for the pulses in any given pair applied to the delay line to travel to the opposite ends thereof, whereat they are dissipated in the characteristic impedance of the delay line as discussed with reference to FIG. 1. As will become apparent, coincidence would occur between unrelated pulses, resulting in the illumination of undesired electroluminescent panels, if the "blank" period were not provided.

The flip-flops FFHM and FFB are symbolically illustrated and a brief description of the operation thereof may be helpful in understanding the operation of the solid state clock. Each flip-flop has two sections, one being designated "S" and the other being designated "R." An input is connected to the junction between the "S" and "R" sections and outputs are respectively connected to the "S" and "R" sections. When an input pulse or signal is applied to the input, the flip-flop is switched from one state to the other state. A desired output signal is provided at the "S" output when the flip-flop is set and a desired output signal is provided at the "R" output when the flip-flop is reset.

The output of the "hour-minute" storage unit CSHM is connected to the input of the "blanking" flip-flop FFB so that, in response to output pulses produced by the storage unit CSHM, the flip-flop FFB is alternately switched between the set and reset conditions. The "S" output terminal of the flip-flop FFB, in turn, is connected to the input of the flip-flop FFHM and is also connected to input terminals of the gates ANDH1 and ANDM1. It follows that each time the flip-flop FFB is set the flip-flop FFHM is driven from one state to the other state. Thus, the flip-flop FFHM is driven to one state when flip-flop FFB is set and remains in that state during the time when the flip-flop FFB is in the reset condition, the time period during which the flip-flop FFB is in the reset condition being designated as the "blank" period as will become apparent. Subsequently, when flip-flop FFB is again set, flip-flop FFHM is driven to its other state. It also follows that gates ANDH1 and ANDM1 are conditioned for being enabled when the flip-flop FFB is in the set condition and, conversely, are maintained enabled during the time period when the flip-flop FFB is in the reset or "blanking" condition.

The "S" output terminal of the flip-flop FFHM is connected to inputs of the gates ANDM1 and ANDM2, whereas the "R" output terminal is connected to inputs of the gates ANDH1 and ANDH2. As a result, gate ANDM1 is conditioned for being opened and gate ANDM2 is opened when the flip-flop FFHM is in the set condition, whereas gates ANDH1 and ANDH2 are maintained closed. Conversely, when the flip-flop FFHM is in the reset condition, gate ANDH1 is conditioned for being opened and gate ANDH2 is opened, whereas gates ANDM1 and ANDM2 are maintained closed. In view of the foregoing, it may be seen that, when the flip-flop FFHM is in the set condition, input pulses are transmitted from the oscillator 20 through gates ANDM2 and ORHM' to the "hour-minute" storage unit CSHM. Conversely, when the flip-flop FFHM is in the reset condition, input pulses are transmitted from the frequency multiplier 21 through gates ANDH2 and ORHM' to the storage unit CSHM. Thus, at all times, input pulses are being applied to the storage unit CSHM from either the oscillator 20 or the frequency multiplier 21.

The gate ANDH1 is designed to be opened when flip-flop FFHM is in the reset condition and flip-flop FFB is in the set condition so that input pulses are transmitted therethrough and through gate ORH to the "hour" storage unit CSH from the frequency multiplier 21. Likewise, the gate ANDM1 is designed to be opened when flip-flop FFHM is in the set condition and flip-flop FFB is in the set condition so that input pulses are transmitted therethrough and through gate ORM to the "minute" storage unit CSM from the oscillator 20.

A brief description of the operation of storage units CSH, CSM and CSHM, as controlled by the flip-flops FFHM and FFB, may be helpful in understanding the operation of the control circuitry as described thus far. For this purpose, let it be assumed that initially both the flip-flops FFHM and FFB are in the set conditions. Let it be further assumed that storage units CSH, CSM and CSHM have no pulses stored therein. Accordingly, gates ANDM1 and ANDM2 are open so that pulses are transmitted therethrough and through the respective gates ORM and ORHM' to the storage units CSM and CSHM from the oscillator 20 at a frequency of $f$. Since the counter K2 in the storage unit CSM is a "60" counter, an output pulse will be produced thereby when sixty pulses have been transmitted thereto from the oscillator 20 and the output pulse ("minute" pulse) will be transmitted through the gate ORHM and the amplifier AMPA to the left-hand terminal of the delay line. Likewise, since the counter K3 in the storage unit CSHM is also a "60" counter, an output pulse is also produced thereby in response to the application of sixty input pulses thereto from the oscillator 20 and the output pulse ("minute" pulse) is transmitted through the amplifier AMPB to the right-hand terminal of the delay line as shown. It follows that a selected panel in the delay line will be illuminated indicating the minute hand position. Since, for this brief description, it has been assumed that sixty pulses are required to fill both the counters K2 and K3, the "minute" input pulses will be simultaneously applied to opposite ends of the delay line and the central panel will be illuminated.

The output pulse produced by the storage unit CSHM is also transmitted to the input of the flip-flop FFB causing the flip-flop to be driven to the reset condition whereby gate ANDM1 is closed so that pulses may no longer be transmitted therethrough to the storage unit CSM. At this time, however, a "blanking" period begins during which gate ANDM2 is still open since the flip-flop FFHM is still in the set condition so that pulses from the oscillator 20 continue to be transmitted therethrough and through gate ORHM' to the storage unit CSHM. An output pulse will again be produced by the storage unit CSHM when sixty additional input pulses have been applied thereto and the output pulse is again applied to the delay line as well as to the input of the flip-flop FFB causing the flip-flop to be driven back to the set condition.

In response to the flip-flop FFB being set, the flip-flop FFHM is driven to the reset condition. At this time, gates ANDH1 and ANDH2 are opened so that pulses are subsequently applied therethrough and through the respective gates ORH and ORHM' to the storage units CSH and CSHM from the frequency multiplier 21 at a frequency of 2$f$. Since the counter K1 in the storage unit CSH is a "60" counter, an output pulse is produced thereby in response to the application of sixty pulses thereto from the frequency multiplier 21 and the output pulse ("hour" pulse) is transmitted through gate ORHM and the amplifier AMPA to the left-hand terminal of the delay line. Likewise, the storage unit CSHM produces another output pulse in response to the receipt of sixty input pulses from the frequency multiplier 21 and the output pulse ("hour" pulse) is transmitted through amplifier AMPB to the right-hand terminal of the delay line. It follows that a portion of a selected panel in the delay line will be illuminated indicating the hour hand position. Since, again, it has been assumed that sixty pulses are required to fill both the counters K1 and K3, the "hour" input pulses will be simultaneously supplied to opposite ends of the delay line and a portion of the central panel will be illuminated.

The output pulse from the storage unit CSHM is again transmitted to the input of the flip-flop FFB causing the flip-flop to again be driven to the reset condition whereby gate ANDH1 is closed so that pulses may no longer be transmitted therethrough to the storage unit CSH. At this time, another "blanking" period begins during which gate ANDH2 is still open so that pulses are still being transmitted therethrough and through gate ORHM' to the storage unit CSHM from the frequency multiplier 21. Accordingly, when sixty additional input pulses are applied to the storage unit CSHM, an output pulse is produced thereby which is again transmitted to the delay line and to the input of the flip-flop FFB causing the flip-flop to be set. The above-described cycle will then repeat.

From the foregoing, it will be apparent that two pulses are applied to the delay line by the storage unit CSHM during each time period in which either "minute" or "hour" pulses are to be applied thereto, whereas only one pulse is applied thereto by the respective storage unit CSM or CSH. This is true since a pulse is applied to the delay line from storage unit CSHM when the "blanking" flip-flop FFB is set to condition either storage unit CSM or storage unit CSH for receiving input pulses and a pulse is applied thereto from the storage unit CSHM when the "blanking" flip-flop FFB is reset to prevent the application of input pulses to storage units CSM and CSH. Thus, a pulse is applied to the delay line by storage unit CSHM at the beginning and at the end of each time period during which either "minute" or "hour" input pulses are to be applied thereto.

Since the oscillator 20 and the frequency multiplier 21 are providing pulses at extremely high rates, "hour" pulses and "minute" pulses are alternately applied to opposite ends of the delay line at rates such that the electroluminescent panels illuminated by coincidence of the pulses appear to remain illuminated throughout the time period during which pulses coincide thereadjacent. This phenomena exists since the panels are illuminated and extinguished at a rate faster than can be detected by the human eye. Thus, in view of the foregoing, it will become apparent that each electroluminescent panel illuminated in response to the coincidence of "hour" pulses appears to remain illuminated for twelve minutes and each electroluminescent panel illuminated in response to the coincidence of "minute" pulses appears to remain illuminated for one minute.

As mentioned above, both the conductive rings RM and RHM are to be associated with the panels when "minute" pulses are applied to the delay line so that an entire panel is illuminated to indicate the position of the minute hand, whereas only ring RHM is to be associated with the panels when "hour" pulses are applied to the delay line so that only the lower portion of a panel is illuminated to indicate the position of the hour hand. For this purpose, the conductive ring RHM is connected directly to a negative potential, designated as "V," so that it is always electrically associated with the panels. On the other hand, the conductive ring RM is connected to the negative potential "V" through a gate ANDM3, the operation of which is controlled by the flip-flop FFHM, so that the gate ANDM3 is open to electrically associate the ring RM with the panels only when the flip-flop FFHM is in the set condition. As previously mentioned, when the flip-flop FFHM is in the set condition, the control circuitry is operating to apply "minute" input pulses to the delay line. During this time, both of the conductive rings RM and RHM are electrically associated with the negative potential "V" so that an entire electroluminescent panel is illuminated in response to the coincidence of the "minute" pulses thereadjacent indicating the position of the minute hand. Conversely, when the flip-flop FFHM is in the reset condition, the control circuitry operates to apply "hour" input pulses to opposite ends of the delay line. During this time, the gate ANDM3 will be closed so that only the conductive ring RHM is electrically associated with the negative potential "V." Thus, only the lower portion of an electroluminescent panel is illuminated in response to coincidence of the "hour" pulses thereadjacent indicating the position of the hour hand.

In further keeping with the instant feature of the present invention, means are provided for altering the time relationship between the application of "minute" input pulses and "hour" input pulses to opposite ends of the delay line. More specifically, means are provided for applying auxiliary input pulses to the storage units CSH and CSM so that "sustained" counts are stored therein corresponding to the number of auxiliary input pulses applied thereto, i.e., so that the storage units are partially filled by the auxiliary input pulses. Since the storage units CSH and CSM will be partially filled in response to the application of auxiliary input pulses thereto, it follows that fewer input pulses from the oscillator 20 or the frequency multiplier 21 will be required to fill the storage units than are required to fill the storage unit CSHM during a corresponding cycle of operation, each auxiliary pulse resulting in one less pulse from the oscillator or frequency multiplier being required. The excess input pulses applied to the storage units CSH and CSM from the oscillator 20 and the frequency multiplier 21, during a portion of a cycle wherein sixty pulses are simultaneously applied to the storage unit CSH or the storage unit CSM and the storage unit CSHM, will restore the "sustained" counts therein.

If an auxiliary input pulse is applied to the "minute" storage unit CSM every minute, then every minute one less pulse from the oscillator 20 will be required to fill this storage unit than are required to fill the storage unit CSHM. Accordingly, the time relationship between the production of output pulses, i.e., "minute" pulses, by the storage units CSM and CSHM will be varied every minute. If the circuit components of the delay line are correctly chosen, it follows that the coincidence of "minute" input pulses applied to opposite ends of the delay line by the storage units CSM and CSHM continuously occurs adjacent a selected electroluminescent panel for one minute. At the end of that one minute time period, the time relationship between the "minute" pulses is altered in response to an auxiliary pulse being stored in storage unit CSM and coincidence of the "minute" input pulses subsequently occurs adjacent the next succeeding electroluminescent panel causing that panel to be illuminated for a one minute time period. Since pulses no longer coincide adjacent the previously illuminated panel (the next preceding panel), it follows that it will be extinguished. From the foregoing, it is apparent that the storage units CSM and CSHM control the illumination of the panels in accordance with the movement of the minute hand.

In the exemplary circuit shown in FIG. 6, a "minute-control" frequency divider unit FDMC is provided for supplying auxiliary input pulses to the "minute" storage unit CSM. As may be seen, the input of the frequency divider unit FDMC is connected to the output of a 60 c.p.s. (cycle per second) source 22, whereas the output thereof is connected to the input of the storage unit CSM through the gate ORM. The frequency divider unit FDMC is similar to the other storage units and, likewise, includes a pulse former PF4 for providing output pulses having a constant volt-second content in response to each cycle of the 60 c.p.s. source and a counter K4. For the desired operation, the counter K4 is filled to produce an output pulse in response to the application thereto of thirty-six hundred input pulses from the 60 c.p.s. source. Since the 60 c.p.s. source operates at thirty-six hundred cycles per minute, it will be apparent that thirty-six hundred input pulses are applied to the frequency divider unit FDMC every minute so that one output pulse is produced thereby every minute. Thus, one auxiliary input pulse is applied to the storage unit CSM from the frequency divider unit FDMC every minute.

For the purpose of preventing the transmission of pulses from the oscillator 20 to the storage units CSM and CSHM at the same time an auxiliary input pulse is being applied to the storage unit CSM, an inverter unit INM is provided which is connected between the output of the frequency divider unit FDMC and inputs to the gates ANDM1 and ANDM2. The inverter unit INM responds to an auxiliary input pulse to provide an output which maintains the gates ANDM1 and ANDM2 closed. Conversely, when no auxiliary input pulse is being provided, the inverter unit provides an output which conditions the gate ANDM1 and ANDM2 for being opened.

In the exemplary arrangement, five electroluminescent panels are positioned between each hour position on the clock face. In order to have the hour hand step to succeeding panels at the correct times, it is necessary to apply an auxiliary input pulse to the storage unit CSH at the end of every twelve minute time period, the five panels dividing each hour into five twelve minute time periods. It follows that, if an auxiliary input pulse is applied to the "hour" storage unit CSH every twelve minutes, then every twelve minutes one less pulse from the frequency multiplier 21 will be required to fill the "hour" storage unit. Accordingly, the time relationship between the production of output pulses, i.e., "hour" pulses, by the storage units CSH and CSHM will be varied every twelve minutes. If the components of the delay line are correctly chosen, the coincidence of "hour" input pulses applied to opposite ends of the delay line by the storage units CSH and CSHM continuously occurs adjacent a selected panel for twelve minutes. At the end of that twelve minute time period, the time relationship between the "hour" pulses is altered in response to an auxiliary pulse being stored in storage unit CSH and the coincidence of the "hour" input pulses subsequently occurs adjacent the next succeeding electroluminescent panel causing a portion of that panel to be illuminated for a twelve minute time period. Since pulses no longer coincide adjacent the previously illuminated panel (the next preceding panel), it will be extinguished. From the foregoing, it is readily apparent that the storage units CSH and CSHM control the illumination of the panels in accordance with the movement of the hour hand.

For the purpose of causing auxiliary input pulses to be applied to the "hour" storage unit CSH, the input to the storage unit CSH is connected through the gate ORH, a gate ANDHC, an amplitude discriminator and integrator 23 and a gate ORHC to the winding 16 of the delay line. As may be seen, the gate ORHC has five inputs which are connected to the winding 16 adjacent selected electroluminescent panels, and the gate ORHC controls the transmission of auxiliary input pulses to the storage unit CSH when coincidence between "minute" input pulses occurs adjacent one of the selected panels. In the exemplary arrangement, the inputs to the gate ORHC are connected to the winding 16 adjacent panels $EL_{59}$, $EL_{11}$, $EL_{23}$, $EL_{35}$ and $EL_{47}$, these representing five minute positions in an hour spaced twelve minutes apart so that one auxiliary input pulse is applied to the storage unit CSH every twelve minutes. The gate ORHC includes five diodes $D_{59}$, $D_{11}$, $D_{23}$, $D_{35}$ and $D_{47}$ which are provided to control the transmission of signals to the amplitude discriminator and integrator 23 from the delay line and to prevent the feedback of these signals into the delay line. The amplitude discriminator and integrator 23 is provided to detect the coincidence of "minute" pulses adjacent one of the selected electroluminescent panels and to integrate the signals produced by the coincidence of the "minute" pulses during the one minute time period during which the selected electroluminescent panel is illuminated, the integrated signal constituting an auxiliary input pulse. The gate ANDHC is provided for the purpose of controlling the transmission of the integrated signal stored in the amplitude discriminator and integrator 23 to the storage unit CSH so that an auxiliary input pulse is applied to the storage unit CSH only at the end of the one minute time period during which one of the selected electroluminescent panels is illuminated.

As may be seen, the "S" output terminal of the flip-flop FFHM is connected to an input of the gate ANDHC to condition the gate for being opened when the flip-flop is in the set condition. Additionally, the output of the "minute-control" frequency divider unit FDMC is connected to an input of the gate ANDHC to condition the gate for being opened when an output pulse is produced thereby indicating the end of a one minute time period. The gate ANDHC is designed to be opened only when simultaneously conditioned by the outputs of the flip-flop FFHM and the frequency divider unit FDMC. Thus, an auxiliary input pulse may be transmitted through the gate ANDHC to the storage unit CSH only when the flip-flop FFHM is in the set condition and an output pulse is produced by the frequency divider unit FDMC. Since input pulses are applied to the storage unit CSH from the frequency multiplier 21 only when the flip-flop FFHM is in the reset condition, this insures that such input pulses are not applied to the storage unit CSH simultaneously with the application of an auxiliary input pulse thereto from the amplitude discriminator and integrator 23.

For the purpose of allowing the clock to be preset to a desired time, a fast-set output and a slow-set output are provided in the frequency divider unit FDMC which are connected to the storage unit CSM through respective "time setting" switches 24A and 24B and through the gate ORM. When the switch 24A is closed, the fast-set output is connected to the storage unit CSM so that auxiliary input pulses are applied thereto at a high rate, for example thirty-six hundred pulses per minute, whereby the minute hand is stepped at a rate of thirty-six hundred steps per minute and the hour hand is stepped at a rate of three hundred steps per minute. When the switch 24B is closed, the slow-set output is connected to the storage unit CSM so that auxiliary input pulses are applied thereto at a slower rate, for example sixty pulses per minute, whereby the minute hand is stepped at a rate of sixty steps per minute and the hour hand is stepped at a rate of five steps per minute.

As an alternative method for applying auxiliary input pulses to the "hour" storage unit CSH, an "hour-control" frequency divider unit FDHC may be utilized. The input of the storage unit FDHC would be connected to the output of the "minute-control" frequency divider unit FDMC and the output would be connected to the gate ORH, such connections being illustrated as dotted lines in FIG. 6. Similar to the other storage units, the storage unit CSHC would also include a pulse former PF5 and a counter K5. The counter K5 would be designed to provide an auxiliary input pulse to the storage unit CSH in response to every twelve pulses produced by the frequency divider unit FDMC which would correspond to the passage of a twelve minute time period. Thus, an auxiliary input pulse would be applied to storage unit CSH every twelve minutes.

As discussed hereinabove, when it is desired for coincidence to occur adjacent the next succeeding panel indicating the movement of a clock hand, an auxiliary input pulse must be applied to the storage unit CSH or the storage unit CSM depending on which hand of the clock is to move. Subsequent to the application of the auxiliary input pulse to the selected storage unit, it will be apparent that the input pulse applied to the left-hand terminal of the delay line, from the storage unit CSH or CSM then functioning, must travel an additional two sections of the delay line in the time period required for one additional input pulse to be applied to the storage unit CSHM.

For example, if coincidence of the "minute" input pulses is initially to occur adjacent the panel $EL_0$ which is the central panel, the "minute" input pulses will be simultaneously applied to the opposite ends of the delay line. Under such conditions, the two "minute" input pulses will both travel down the delay line thirty delay line sections before coincidence occurs. Subsequently, if an auxiliary input pulse is applied to the storage unit CSM indicating the passage of a one minute time period and indicating that coincidence is now to occur adjacent the panel $EL_1$, it will be apparent that the "minute" input pulse applied to the left-hand terminal of the delay line must travel down the delay line thirty-one sections for coincidence to occur, whereas the "minute" input pulse applied to the right-hand terminal must travel down the delay line twenty-nine sections. Thus, in the time period required for one additional input pulse to be applied to the storage unit CSHM (one less pulse being required to fill storage unit CSM because of the auxiliary pulse), the "minute" input pulse applied to the left-hand terminal of the delay line by the storage unit CSM must travel down the delay line a distance of two sections thereof. Since the oscillator 20 is supplying pulses to the storage unit CSHM at a rate of $f$ (100 kc. in the exemplary arrangement) when "minute" pulses are to be provided ("minute" pulses being applied at a rate of 100 kc./60), the time period required for a "minute" pulse to travel from one panel to the next succeeding panel, i.e., to travel the distance of one section of the delay line, is equal to $\frac{1}{2} \times 1/f$ or $\frac{1}{2}f$ (.000005 second or 5 microseconds in the exemplary arrangement).

Likewise, when "hour" input pulses are applied to the delay line, the pulse applied to the left-hand terminal from the storage unit CSH must travel an extra two delay line sections for each auxiliary input pulse applied thereto. Since input pulses are applied to the storage units CSH and CSHM from frequency multiplier 21 at a rate of $2f$ (200 kc. in the exemplary arrangement) when "hour" pulses are to be provided ("hour" pulses being applied at a rate of 200 kc./60), the time required for an "hour" pulse to travel from one panel to the next succeeding panel, i.e., to travel a distance of one delay line section, is equal to $\frac{1}{2} \times \frac{1}{2}f$ or $\frac{1}{4}f$ (.0000025 second or $2\frac{1}{2}$ microseconds in the exemplary arrangement). As may be seen, the time required for an "hour" pulse to travel from one panel to the next succeeding panel is one-half the time required for a "minute" pulse to travel the same distance. This is so since, as previously mentioned, only the conductive ring RHM is associated with the delay line when "hour" pulses are applied thereto, whereas both the conductive rings RM and RHM are associated with the delay line when "minute" pulses are provided, this resulting in the delay per section of the delay line being cut in half when "hour" pulses are applied thereto. In view of the foregoing, it is apparent that the delay line must be designed to have a delay per section of $\frac{1}{2}f$ (5 microseconds) when pulses are provided at a frequency of $f$ (100 kc.) and a delay per section of $\frac{1}{4}f$ ($2\frac{1}{2}$ microseconds) when pulses are provided at a frequency of $2f$ (200 kc.).

Figure 7:
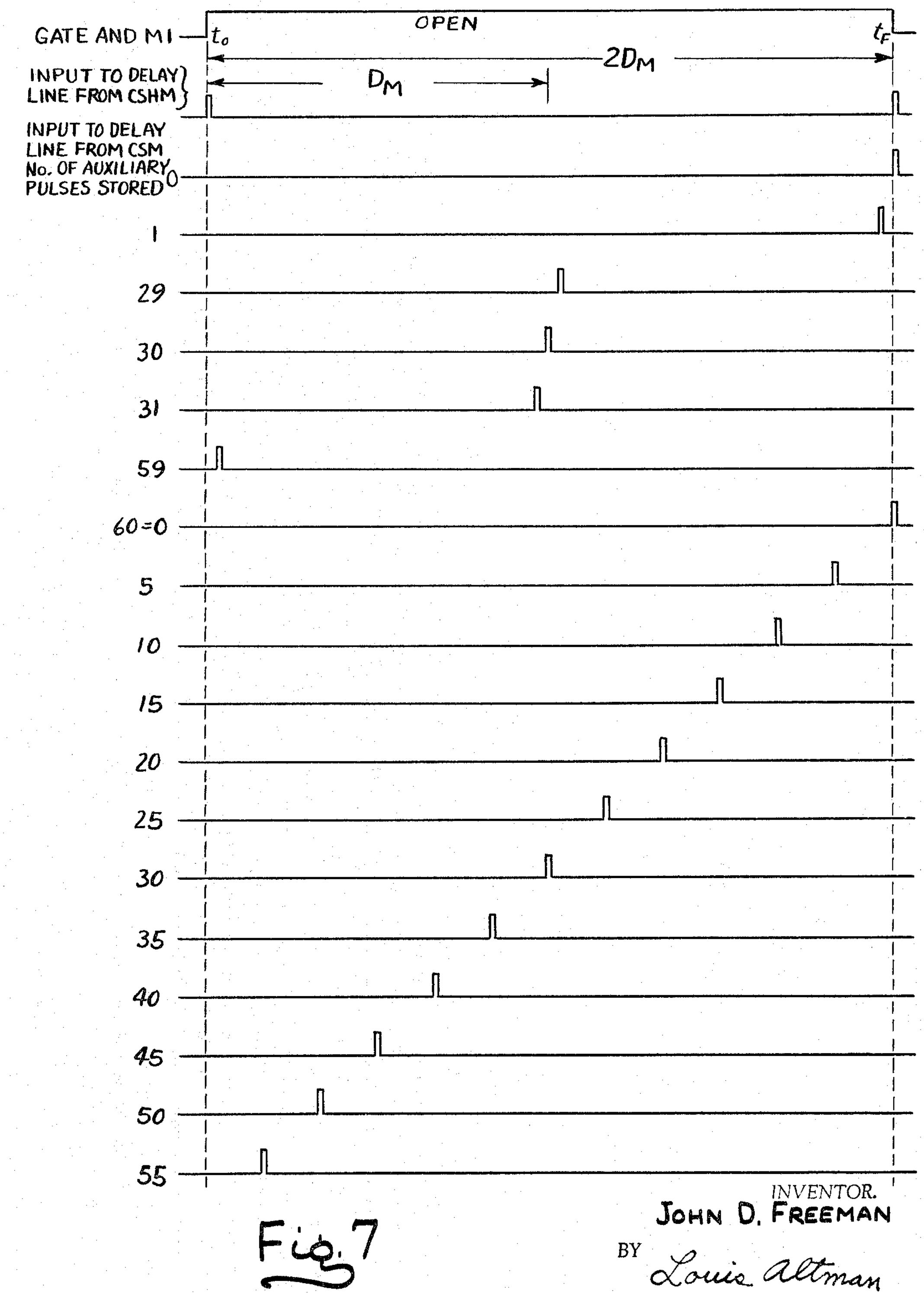
FIG. 7 is a diagram showing the relationships between the applications of pulses to opposite ends of the delay line of FIG. 6 when selected panels are to be illuminated.
Figure 8:
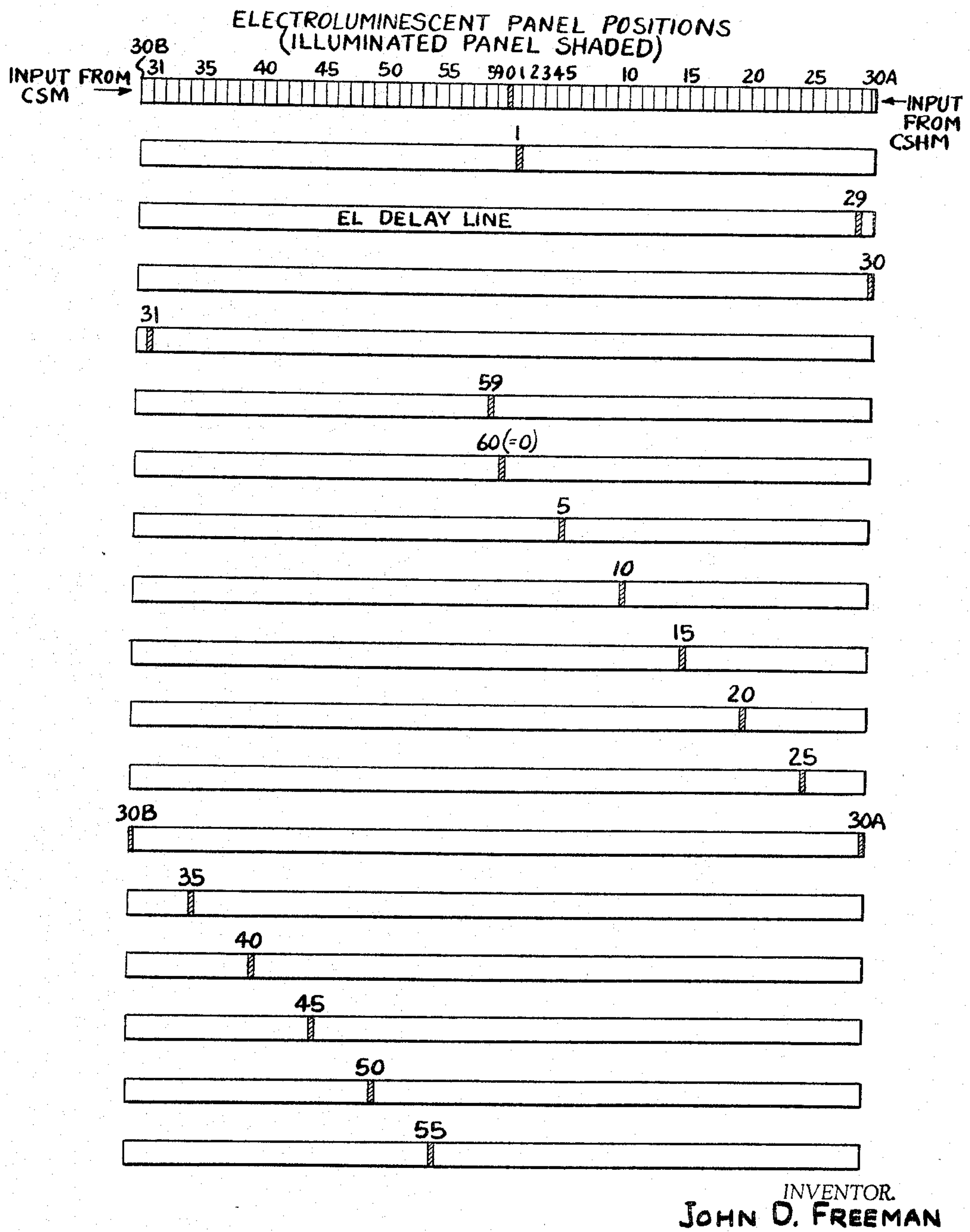
FIG. 8 is a diagram showing the panels illuminated by the coincidence of the pulses shown in FIG. 7.

For the purpose of providing a general description of the overall operation of the solid state clock described hereinabove, reference is made to FIGS. 7 and 8. FIGS. 7 and 8 are minute hand pulse coincidence diagrams wherein FIG. 7 illustrates the time relationship between the application of pulses to opposite ends of the delay line from storage units CSM and CSHM for selected minute hand positions and FIG. 8 illustrates the panel illuminated in repsonse to the application of the pulses, shown in FIG. 7, to the delay line. For a clearer understanding of the relationship between FIGS. 7 and 8, these figures should be placed in side-by-side relationship such that the delay line coincidence representations in FIG. 8 are aligned with the correspondingly designated input pulse representations for the storage unit CSM.

Referring to FIG. 7, it may be seen that the gate ANDM1 is open from time $t_0$ to time $t_F$ so that pulses are transmitted therethrough to the storage unit CSM from the oscillator 20. As previously set forth, a "minute" pulse applied to the delay line must travel a distance of two delay line sections during the time required for a single pulse to be applied to the storage units CSM and CSHM by the oscillator 20. Since there is a total of sixty delay line sections, it follows that a "minute" input pulse to the delay line travels the entire length of the delay line in the time period required for thirty input pulses to be applied to the storage units CSM and CSHM by the oscillator 20. Thus, the total delay $D_M$ of the delay line when "minute" pulses are applied thereto is equal to the time required from the oscillator 20 to provide thirty output pulses and is equal to $30/f$ ($30/100{,}000$ second or 300 microseconds in the exemplary embodiment).

In view of the foregoing description of the operation of the storage unit CSHM, and gate ANDM1 is opened in response to the production of a pulse by the storage unit CSHM at time $t_0$ and the gate ANDM1 is closed in response to the production of a subsequent pulse by the storage unit CSHM at time $t_F$. Since the counter K3 in the storage unit CSHM is a "60" counter, it follows that sixty input pulses from the oscillator 20 must be applied thereto to cause the second pulse to be produced thereby. Consequently, the time period between times $t_0$ and $t_F$ is equal to twice the total delay $D_M$ of the delay line, and the pulse produced by the storage unit CSHM at time $t_0$ will have reached the opposite end of the delay line midway during this time period, i.e., when thirty pulses have been applied to the storage unit CSM.

As a first example, let is be assumed that no auxiliary input pulses are stored in the counter of the storage unit CSM, this indicating that the minute hand should be at the zero minute position and the panel $EL_0$ should be illuminated. Accordingly, sixty input pulses must be applied to the storage unit CSM and, since the time period required to apply sixty pulses thereto corresponds to the time period during which the gate ANDM1 is open, a "minute" pulse is produced by the storage unit CSM at time $t_F$ which corresponds to the time when the second "minute" pulse is produced by the storage unit CSHM. Thus, "minute" pulses are simultaneously applied to opposite ends of the delay line and coincide adjacent the central electroluminescent panel $EL_0$, as shown in FIG. 8 which panel represents the zero minute position. The first pulse produced by the storage unit CSHM at time $t_0$ will have no effect on the operation of the delay line since it will have traveled the entire length of the delay line and will, thus, have dissipated in the characteristic impedance of the delay line when only thirty pulses had been applied to the storage units CSM and CSHM.

Now let is be assumed that fifteen auxiliary input pulses have been applied to the storage unit CSM, indicating that the minute hand should be at the fifteen minute position and panel $EL_{15}$ should be illuminated. Under such conditions, forty-five, rather than sixty, input pulses must be applied to the storage unit CSM from the oscillator 20 to cause a "minute" pulse to be produced thereby. On the other hand, sixty input pulses must still be applied to the storage unit CSHM to cause a "minute" pulse to be produced thereby at time $t_F$. Since fifteen less input pulses are required for a "minute" pulse to be produced by the storage unit CSM than for a "minute" pulse to be produced by the storage unit CSHM, the "minute" pulse applied to the delay line by the storage unit CSM will have traveled down the delay line thirty delay line sections, i.e., will have reached the middle section $EL_0$, when the "minute" pulse is applied thereto by the storage unit CSHM at time $t_F$. It follows that coincidence between such pulses will occur midway between the center of the delay line (panel $EL_0$) and the right-hand terminal (panel $EL_{30A}$) thereof as illustrated in FIG. 8, such a position corresponding to the position of the electroluminescent panel $EL_{15}$ representing the fifteen minute position of the minute hand.

As a third example, let it be assumed that forty-five auxiliary input pulses have been applied to the storage unit CSM, this indicating that the minute hand should be at the forty-five minute position and electroluminescent panel $EL_{45}$ should be illuminated. Under such conditions, only fifteen input pulses must be applied to the storage unit CSM to cause a "minute" pulse to be applied thereby to the delay line. Since sixty input pulses must be applied to the storage unit CSHM for a "minute" pulse to be produced thereby at time $t_F$, it will be apparent that the "minute" pulse produced by the storage unit CSM will have traveled the entire length of the delay line and dissipated in the characteristic impedance prior to the time that this pulse is produced by the storage unit CSHM. However, as previously mentioned, a "minute" pulse is produced by the storage unit CSHM at time $t_0$. Since only fifteen input pulses are required for the storage unit CSM to produce a "minute" pulse, it will be apparent that the "minute" pulse produced by the storage unit CSHM at time $t_0$ will have traveled down the delay line thirty sections and will be adjacent panel $EL_0$ when the "minute" pulse is produced by the storage unit CSM. Accordingly, these pulses will coincide midway between the center of the delay line (panel $EL_0$) and the left-hand terminal (panel $EL_{30B}$) of the delay line as shown in FIG. 8, such a position corresponding to the position of the electroluminescent panel $EL_{45}$ representing the forty-five minute position of the minute hand.

A final example will be described illustrating the simultaneous illumination of the electroluminescent panels 30A and 30B. For this example, let it be assumed that thirty auxiliary input pulses have been applied to the storage unit CSM indicating that the panels representative of the thirty minute position $EL_{30A}$ and $EL_{30B}$ are to be illuminated. Accordingly, thirty input pulses must be applied to the storage unit CSM to cause a "minute" pulse to be produced thereby. Since the first "minute" pulse produced by the storage unit CSHM at time $t_0$ travels the entire length of the delay line in the time required to apply thirty input pulses to the storage unit CSM, it will be apparent that the "minute" pulse produced by the storage unit CSM will coincide with the first "minute" pulse produced by the storage unit CSHM at the left-hand terminal of the delay line (panel $EL_{30B}$) as viewed in FIG. 8. Subsequently, thirty additional pulses must be applied to the storage unit CSHM to cause the second "minute" pulse to be produced thereby at time $t_F$. During this time period, the "minute" pulse applied to the delay line by the storage unit CSM will have traveled the entire length of the delay line and these "minute" pulses will coincide adjacent the electroluminescent panel $EL_{30A}$ at the right-hand terminal of the delay line. Thus, both of the electroluminescent panels $EL_{30A}$ and $EL_{30B}$ are illuminated under these conditions. As previously mentioned, these panels may be ganged together representing a single minute position or one of the panels may be blanked out.

Though the diagrams in FIGS. 7 and 8 have been discussed in conjunction with the application of "minute" pulses to the delay line, it will be apparent that diagrams illustrating the coincidence of "hour" pulses will be the same except for the reduction in the actual delay time resulting from the different capacitor electrode area employed when "hour" pulses are to be produced.

Figure 9:
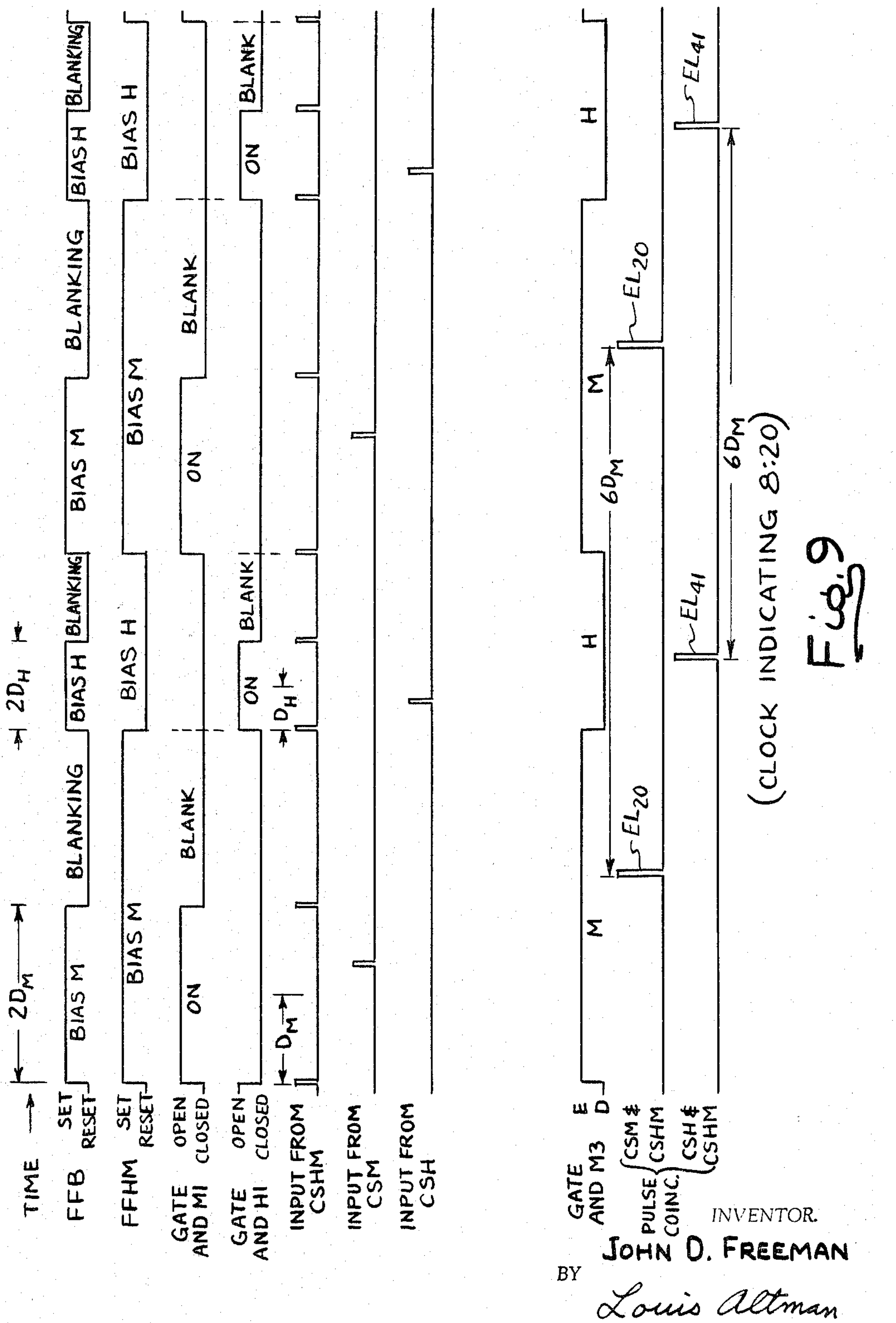
FIG. 9 is a pulse diagram illustrating the operation of the clock in FIG. 6 when the time is 8:20.

Referring now to FIG. 9, a pulse output diagram is illustrated for the condition when the solid state clock is to indicate the time as being 8:20. As may be seen, the time periods of operation for the flip-flops FFB and FFHM during which "minute" pulses are to be applied to the delay line are equal to twice the time periods when "hour" pulses are to be applied thereto, this resulting from the higher frequency at which pulses are applied to storage units CSH and CSHM from the frequency multiplier 21 as described hereinabove. Since the minute hand is to be at the twenty minute position, twenty auxiliary input pulses will have been applied to the storage unit CSM. In view of the above description of the diagrams in FIGS. 7 and 8, it will be apparent that the "minute" pulse produced by the storage unit CSM will have traveled down the delay line forty delay line sections and will be adjacent panel $EL_{10}$ when the second "minute" pulse is produced by the storage unit CSHM at time $t_F$. As a result, coincidence of these pulses will occur at the panel $EL_{20}$ which is midway between panel $EL_{10}$ and the panel $EL_{30A}$ at the right-hand terminal of the delay line as viewed in FIG. 8, illumination of panel $EL_{20}$ representing the twenty minute position of the minute hand. For the clock to indicate a time of 8:20, it will be apparent that the lower portion of the electroluminescent panel $EL_{41}$ must be illuminated indicating the position of the hour hand. Accordingly, forty-one auxiliary input pulses will have been applied to the storage unit CSH. In view of the above description of FIGS. 7 and 8, it follows that the first "hour" pulse produced by the storage unit CSHM will have traveled down the delay line thirty-eight delay line sections and will be adjacent panel $EL_{52}$ when an "hour" pulse is produced by the storage unit CSH. As a result, coincidence of these "hour" pulses will occur at the electroluminescent panel $EL_{41}$ which is midway between panel $EL_{52}$ and the panel $EL_{30B}$ at the left-hand terminal of the delay line as viewed in FIG. 8, illumination of panel $EL_{41}$ representing the position of the hour hand when the time is 8:20.

In view of the foregoing, it may be seen that a solid state clock has been provided wherein succeeding ones of sixty-one electroluminescent panels, spaced at minute intervals on the clock face in the exemplary arrangement, are illuminated every minute to indicate the position of the minute hand and portions of succeeding ones of the electroluminescent panels are illuminated every twelve minutes to indicate the position of the hour hand.

Figure 10A:
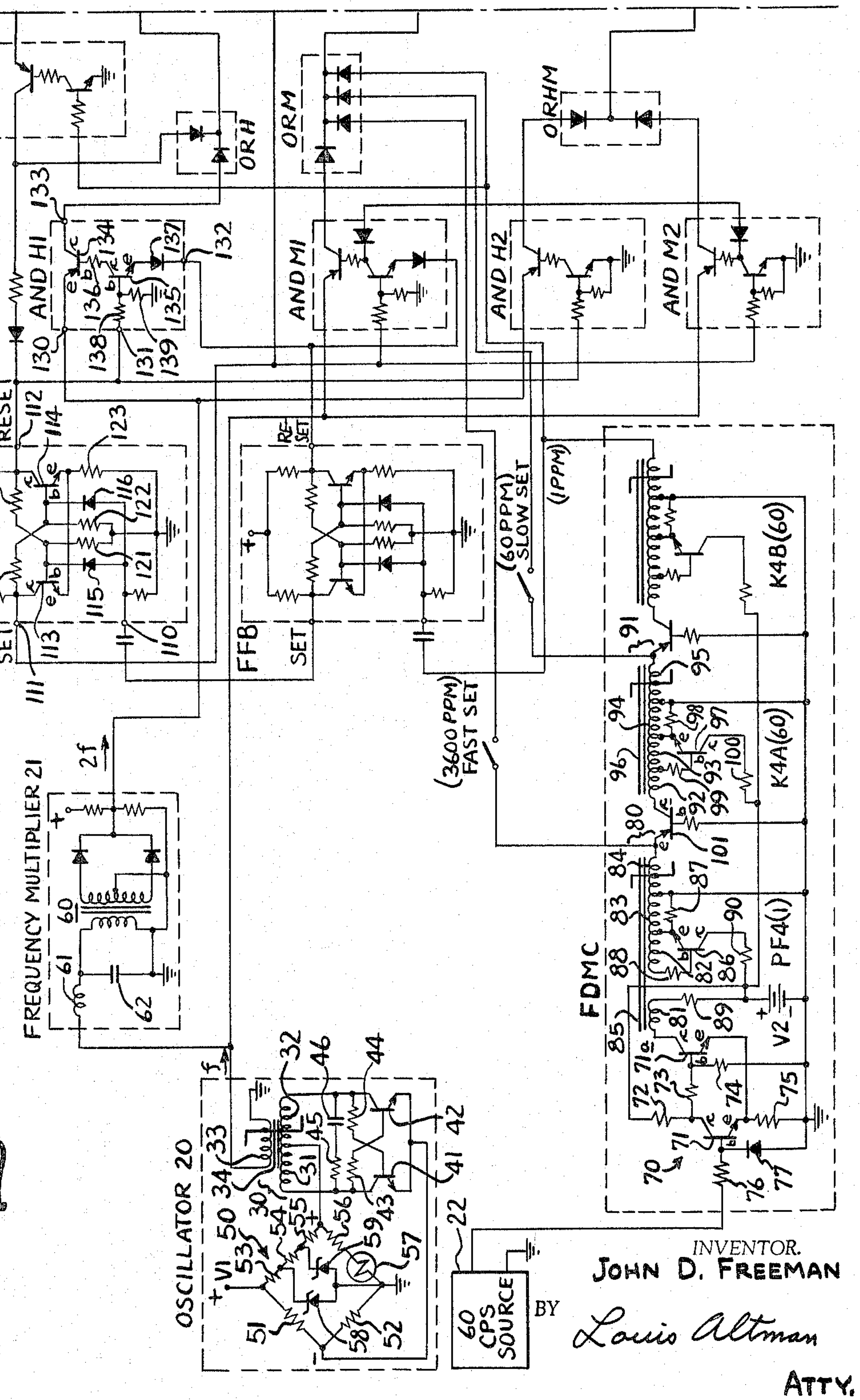
FIGS. 10A and 10B are a schematic diagram of an exemplary solid state clock corresponding to that shown in block form in FIG. 6.
Figure 10B:
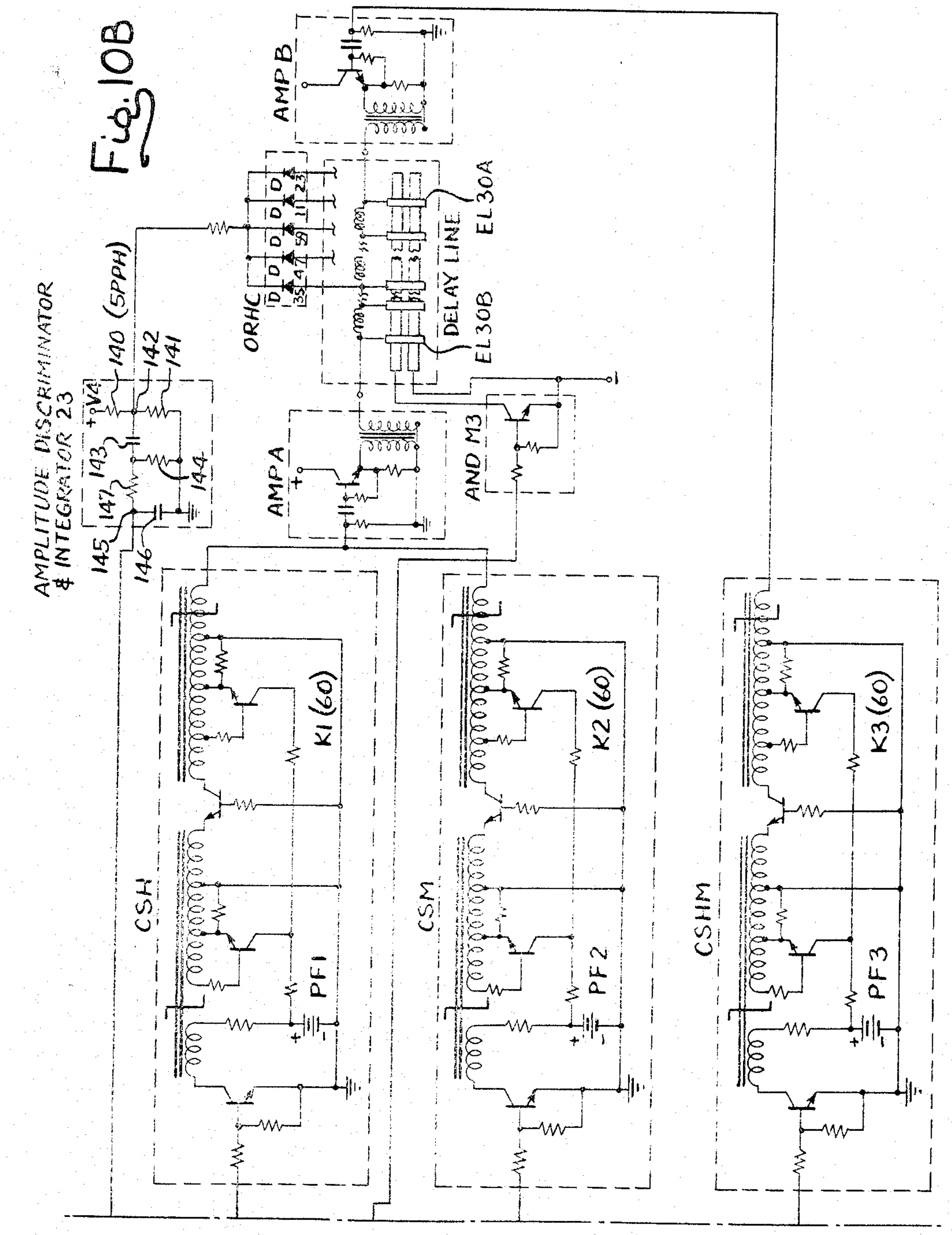

Referring to FIGS. 10A and 10B when positioned end-to-end, a schematic diagram of the solid state clock shown in block form in FIG. 6 is illustrated. Since many of the circuit components are substantially the same or are well known to those skilled in the art, only selected ones of the components will be discussed. As the description of the selected components proceeds, it is to be understood that the invention is not intended to be limited to the specific components illustrated, but raher is inended to cover the use of any equivalent circuit components.

The oscillator 20 is illustrated as a magnetic oscillator including a saturable transformer 30 having a pair of main windings 31 and 32 and an output winding 33, all wound about a core 34. The core is formed of a readily saturable magnetic material having a generally rectangular hysteresis loop, such material being commercially sold, for example, by G. L. Electroncs Company under the name "Orthonik" type P1040. For driving the core into its opposite conditions of saturation, which may for convenience be termed "positive" and "negative" saturation, the windings 31 and 32 are energized by transistors 41 and 42 having base or control circuits which are alternately energized by feedback or "cross" connections including resistors 43 and 44. To improve the output wave form of the oscillator, a resistor 45 and a capacitor 46 are connected in series across the transformer windings 31 and 32. Since the transistors 41 and 42 are of the NPN type, the positive terminal of a power supply source 50 is connected to the center terminal 47 of the transformer main windings 31 and 32 for feeding the collectors of the transistors 41 and 42, and the emitters of the transistors are connected to the negative terminal of the source.

In he exemplary arrangement, the power supply 50 takes the form of a bridge circuit designed to render the oscillator 20 substantially immune to minor changes in the voltage of a voltage source, designated as V1, which supplies the bridge circuit. As may be seen, the bridge circuit 50 has resistors 51 and 52 in two of the legs, a series arrangement of resistors 53–55 in one of the legs and a series arrangement of resistor 56 and a thermistor 57 in the fourth leg. Further, a pair of zener diodes 58 and 59 are connected between ground and selected points in the series arrangement of resistors 53–55. Bridges of this type, wherein thermistors and zener diodes are utilized for temperature control, are known to those skilled in the art and, therefore, operation of the bridge circuit will not be described in detail. Suffice it to say that such a bridge enables closer control of voltage so that, as a result, the frequency of the oscillator remains substantially constant in the face of variations in the voltage source V1.

In operation of the oscillator 20, application of the supply voltage causes both of the transistors 41 and 42 to tend to conduct, but because of a slight inherent unbalance in the circuit, one transistor will normally tend to conduct more heavily than the other. Conduction in the predominating transistor induces a voltage in the associated transformer winding which is in such a direction as to forward bias the transistor so that the predominating transistor tends to conduct more heavily. In response to conduction of the predominating transistor, the potential at the collector thereof drops and, since the base of the other transistor is connected thereto through the "cross" connection, the other transistor is rendered nonconductive. When saturation of the core is reached, the rate of change of flux decreases, hence, by transformer action, the induced forward biasing voltage decreases and the current in the conducting transistor decreases so that the potential at the collector rises. The rising collector potential turns on the former nonconducting transistor and conduction in this transistor induces a voltage in the assosciated transformer winding which is in such a direction as to forward bias this transistor so that this transistor tends to conduct more heavily. Conduction in the second transistor causes the potential at the collector thereof to drop so that the former conducting transistor is rendered nonconductive. The current flowing in the second transistor now drives the core to the opposite condition of saturation. This cycle is repeated at a rate which is directly proportional to the applied voltage and inversely proportional to the saturation flux, the number of turns in the transformer winding, and the value of resistance connected between the transistor emitters and ground. Voltage pulses are induced in the output winding 33, as the core switches from one condition of saturation to the other condition of saturation and back again and the voltage pulses constitute the output signal of the oscillator 20, output pulses being produced by the oscillator at the frequency rate designated as $f$. Further, the output signal provided by the illustrated oscillator will be a square-wave type output.

The frequency multiplier 21 is illustrated as a conventional full wave rectifier including a center-tapped transformer 60 and a pair of diodes to which pulses from the oscillator 20 are transmitted through a filter network which includes an inductor 61 and a capacitor 62. Such frequency multipliers are well known to those skilled in the art and therefore the details will not be set forth. Suffice it to say that, in response to the application of the ocsillator output thereto, the frequency is doubled, i.e., pulses are produced by the oscillator 20 at a frequency rate of $f$, whereas pulses are produced by the frequency multiplier 21 at a frequency rate of $2f$.

For the purpose of providing a brief description of a typical pulse former and a typical counter as utilized in the storage and frequency divider units of the solid state clock, reference is made to the frequency divider unit FDMC. Since the unit FDMC is powered by the 60 c.p.s. alternating source 22, the unit also includes an amplifier-limiter circuit 70, disclosed as a conventional Schmitt trigger circuit, which provides a square-wave output signal having a frequency equal to the frequency of the 60 c.p.s. source. The amplifier-limiter circuit includes a transistor 71 having a base, an emitter and a collector, designated as $b$, $e$ and $c$. The collector is connected to a positive supply potential, designated as V2, through a resistor 72 and is connected to ground through resistors 73 and 74. The resistors 72–74 act as a voltage-dividing network. The emitter is connected to ground through a resistor 75. The base is connected to the 60 c.p.s. source through a resistor 76 and is connected to ground through a diode 77. When a positive potential is provided at the output of the 60 c.p.s. source, it is applied directly to the base of the transistor since the diode 77 prevents current from flowing through the resistor 76 and the transistor 71 is rendered conductive, since it is of the NPN type, so that current flows therethrough. Current flowing through the transistor 71 causes the potential at the collector to drop which in turn alters the voltage-dividing effect of the resistors 72–74 so that the output of the amplifier-limiter circuit provided across the resistor 74 drops proportionately in potential. When a negative potential is provided by the 60 c.p.s. source, the diode 77 clamps the base of the transistor 71 to ground since current flows therethrough and through the resistor 76 so that the transistor is rendered nonconductive and the potential at the collector thereof rises toward the positive potential V2. In response to the rising collector voltage, the potential at the output of the amplifier-limiter circuit also rises proportionately. Thus, a square-wave output signal is provided by the amplifier-limiter circuit which is the inverse of the sine wave input signal applied thereto by the 60 c.p.s. source since the output is negative going when the input is positive going and vice versa.

The pulse former PF4 is constructed in accordance with the teachings of U.S. Patent No. 2,897,380, issued July 28, 1959, to C. Neitzert, and reference may be made thereto for the details in construction and operation. Briefly stated, the heart of the pulse former is a saturable reactor 80 having an input winding 81, a triggering winding 82, a reset winding 83 and an output winding 84, all wound on a core 85 constructed of a material having a substantially rectangular hysteresis loop. A transistor 86 has its input circuit connected across the triggering winding 82 and has its output circuit connected in series with the reset winding 83. Power is supplied to the pulse former by a voltage source, designated as V2.

In response to each input pulse, the saturation of the core is exceeded and, when the saturating input pulse is abruptly terminated, the voltage is induced in the triggering winding 82 due to the sudden collapse of excess flux which triggers the transistor 86 so that current flows through the reset winding 83. The resulting flow of current in the reset winding 83 not only drives the core 85 toward its opposite condition of saturation, but also induces a voltage in the triggering winding 82 which causes still further current to flow through the transistor output circuit to the point where a condition of negative saturation is achieved in the core of the reactor. This restores the pulse former to its initial state in readiness to receive a subsequent input pulse and induces an output pulse in the output winding 84 having a predetermined constant volt-second content. A damping resistor 87 is connected in parallel with the reset winding 83, base current for the transistor 86 is limited by a series resistor 88, current in the input winding 85 is limited by a resistor 89, and low value resistor 90 limits reset current and protects the source V2 from being overloaded. Additionally, a transistor 71A is provided for responding to the output of the amplifier-limiter circuit to control the flow of current through the input winding 81.

The counter K4A is also constructed in accordance with the teachings of the above-mentioned Neitzert patent. Briefly stated, the heart of the counter is also a saturable reactor 91 having an input winding 92, a triggering winding 93, a reset winding 94 and an output winding 95, all wound on a core 96 constructed of a material having a substantially rectanglar hysteresis loop. A transistor 97 has its input circuit connected across the triggering winding and has its output circuit connected in series with the reset winding. The material of the core is so chosen and the counter is so constructed that, when an input pulse is applied to the input winding, the magnetization of the core is advanced one step from negative saturation toward the condition of positive saturation.

The number of pulses required for positive saturation to be attained depends upon the cumulative energy content of the input pulses. When a prescribed number of input pulses cause the saturation of the core to be exceeded and the saturating input pulse is abruptly terminated, a voltage is induced in the triggering winding 92 due to the sudden collapse of excess flux which triggers the transistor 97 so that current flows through the reset winding 94. The resulting flow of current in the reset winding not only drives the core toward the opposite condition of saturation, but also induces a voltage in the triggering winding 92 which causes still further current to flow through the transistor output circuit to the point where a condition of negative saturation is achieved in the core of the reactor. This restores the device to its initial state in readiness to receive a new series of input pulses and induces an output pulse in the output winding 95 which appears at the output of the counter.

To prevent operation of the transistor 97 in response to small changes in flux which occur during each step of advancement toward saturation, a damping resistor 98 is placed in parallel with the reset winding 94. Moreover, to limit the base current of the transistor in the face of a large voltage induced in the triggering winding, a series resistor 99 is utilized. Additionally, there is provided in series with the collector of the transistor 97 a low value resistor 100 for the purpose of limiting the reset current which not only tends to protect the transistor, but which also limits the load which is placed upon the power supply V2. For the purpose of controlling the transmission of the output of the pulse former PF4 to the counter K4A, a control transistor 101 is connected therebetween, transistor 101 being rendered conductive when a desired output is induced in the output winding 84 of the pulse former PF4.

In the exemplary arrangement, it may be seen that the frequency divider unit FDMC includes two counter stages K4A and K4B which are "60" counters and which are cascaded. Thus, a fast-set output may be taken off the output winding 84 of the pulse former PF4 so that pulses are provided at a rate of thirty-six hundred pulses per minute and a slow-set output may be taken off the output winding 95 of the counter K4A so that pulses are provided at a rate of sixty pulses per minute.

To provide an understanding of the operation of a typical flip-flop, reference is made to the flip-flop FFHM in FIG. 10A, which has an input terminal 110, a set output terminal 111 and a reset output terminal 112. The flip-flop includes a pair of transistors 113 and 114 which respond to input pulses or signals applied to the input terminal 110 from the flip-flop FFB, the bases of the transistors 113 and 114 being respectively connected to the input terminal 110 through diodes 115 and 116 and the collectors thereof being respectively connected to the "S" output terminal 111 and the "R" output terminal 112. Additionally, the collectors of the transistors are respectively connected to a postive potential, designated as V3, through loading resistors 117 and 118 and are respectively connected to the base of the other transistor through "cross" connecting resistors 119 and 120. The bases of the transistors are also respectively connected to ground through resistors 121 and 122, whereas the emitters thereof are connected to ground through resistor 123.

The diodes 115 and 116 are provided so that the flip-flop only responds to input pulses of a desired polarity, the illustrated flip-flop responding to positive-going input pulses provided by the flip-flop FFB when in the set condition. In essence, the diodes direct input pulses to the base of the associated transistors 113 or 114.

From the foregoing, it will be apparent that, when the base of one of the transistors 113 or 114 is driven positive with respect to the emitter thereof by an input pulse applied to terminal 110, the transistor is rendered conductive. In response to the transistor being rendered conductive, the potential at the collector thereof drops in potential causing the potential at the base of the opposite transistor to drop correspondingly so that the opposite transistor is rendered nonconductive. This results in a regenerative action since the potential at the collector of the nonconductive transistor then rises causing the then-conducting transistor to conduct more heavily. It follows that the then-conducting transistor is rapidly and positively rendered fully conductive, whereas the reverse effect is had on the opposite transistor.

If it is assumed that initially transistor 113 is conductive whereas transistor 114 is nonconductive, it will be apparent that the conductive states of the transistors will be reversed in response to the application of a positive signal to the input terminal 110. Due to the above-described regenerative action, the reversing of the conductive states will take place rapidly and positively so that transistor 114 becomes fully conductive, whereas transistor 113 is rendered fully nonconductive. In response to the next succeeding positive signal applied to input terminal 110, the conductive states of the transistors will again be reversed, such reversing action taking place in response to each succeeding positive signal applied to the input terminal 110.

In the exemplary arrangement, it is to be assumed that the flip-flop FFHM is in the set condition when transistor 114 is conducting and transistor 113 is nonconductive. Under such conditions, the potential at the output terminal 111 is substantially greater than the potential at the output terminal 112, such potentials respectively approaching the potential V3 and ground potential. Accordingly, when the flip-flop FFHM is set, a positive-going signal is provided at terminal 111, whereas a negative-going signal is provided at terminal 112. Conversely, when the flip-flop is in the reset condition, transistor 113 is conducting, whereas transistor 114 is nonconductive. It follows that under such conditions, the potential at the output terminal 112 will be greater than the potential at the output terminal 111, such potentials again respectively approaching the potential V3 and ground potential. Accordingly, when the flip-flop FFHM is reset, a positive-going signal is provided at terminal 112, whereas a negative-going signal is provided at terminal 111.

For the purpose of providing an understanding of the operation of a typical one of the AND gates, reference is made to gate ANDH1. As may be seen, gate ANDH1 includes three input terminals 130–132 and an output terminal 133. Additionally, the gate includes a pair of transistors 134 and 135, respectively being of the PNP and NPN types. Input 130 is connected to the emitter of transistor 134, whereas the output 133 is connected to the collector thereof. The base of transistor 134 is connected to the collector of transistor 135 through a current limiting resistor 136 so that operation of the transistor 134 is controlled by the transistor 135, transistor 134 being rendered conductive when transistor 135 is conductive. The emitter of transistor 135 is connected to the input terminal 132 through a diode 137, whereas the base is connected to the input terminal 131 through resistor 138 and is connected to ground through resistor 139. Further, input terminal 131 is connected to the reset output 112 of flip-flop FFHM, whereas input terminal 132 is connected to the reset output terminal of flip-flop FFB. It follows that, when flip-flop FFHM is in the reset condition, a voltage signal is applied to the base of transistor 135 which approaches the potential V3 so that transistor 135 is conditioned for conduction. Additionally, when flip-flop FFB is in the set condition, the potential at the reset output terminal thereof will be such that current flows through the diode 137 from the emitter of transistor 135. Consequently, when flip-flop FFHM is reset and flip-flop FFB is set, transistor 135 is rendered conductive so that transistor 134 is conditioned for conduction in response to the application of pulses to the input terminal 130 from the frequency multiplier 21 whereby the input pulses are transmitted through the output terminal 133 to the input of the storage unit CSH.

As previously mentioned, the amplifier discriminator and integrator network 23 is provided for responding to the coincidence of "minute" pulses adjacent selected ones of the electroluminescent panels during a one minute time period. The network includes a pair of resistors 140 and 141 which form a voltage-dividing network between a positive potential, designated as V4, and ground. Due to the voltage-dividing effect of resistors 140 and 141, the potential at the common terminal 142, i.e., the input terminal of network 23, is normally at a prescribed level which is greater than the voltage level of a signal applied thereto when a single "minute" input pulse is adjacent one of the selected electroluminescent panels and is less than the voltage level of the signal applied thereto when a pair of "minute" input pulses coincide adjacent a selected electroluminescent panel. Thus, the voltage-dividing network performs the function of discriminating between single "minute" input pulses and pairs of "minute" input pulses being adjacent the selected electroluminescent panels. A first capacitor 143 is associated with the terminal 142 for charging through a resistor 144 to the potential appearing across resistor 141 during steady-state conditions. As a result, under steady-state conditions, the potential at the output terminal 145 is substantially ground potential.

Each time "minute" input pulses coincide adjacent a selected electroluminescent panel, the potential at terminal 142 rises and a capacitor 146 charges through resistor 147, the amount of charge being dependent upon the amount of rise in potential at terminal 142. Subsequent to the coincidence of a pair of "minute" input pulses adjacent a selected electroluminescent panel, the capacitor 146 discharges through resistors 147 and 144. However, the values of the capacitor 146 and resistor 147 and 144 are so chosen that capacitor 146 rapidly charges and slowly discharges. An additional charge is also accumulated in capacitor 143 in response to the coincidence of pulses adjacent the selected panels. However, the values of the capacitor 143 and the resistor 144 are so chosen that the capacitor charges slowly, i.e., relatively speaking, so that substantially no additional charge is accumulated therein. It follows that, during the time period when "minute" pulses are coinciding adjacent a selected electroluminescent panel, the capacitor 146 gradually attains a charge corresponding to the amount of rise in potential at the terminal 142 produced by the "minute" pulses. At the end of a given minute time period during which "minute" pulses coincide adjacent a selected electroluminescent panel, an output pulse from the frequency divider unit FDMC is applied to the gate ANDHC causing the gate to be open so that a path of discharge is provided for the capacitor 146 through the gate ANDHC, the gate ORH and the input circuit of the storage unit CSH. As a result, an auxiliary input pulse is applied to the storage unit CSH having an amplitude corresponding to the charge on capaictor 146. Subsequently, the charge remaining in capacitor 146 is discharged through resistors 147 and 144, the capacitor being completely discharged during the next one minute time period before a subsequent pulse is applied to the gate ANDHC from the frequency divider unit FDMC.

The remaining circuit components in FIG. 10 are substantially the same as those already described or are well known to those skilled in the art and, therefore, will not be described herein.

In accordance with another aspect of the present invention, the solid state clock illustrated in block form in FIG. 6 may be modified such that the delay per section of the delay line is the same for "minute" input pulses and "hour" input pulses. Under such conditions, the frequency multiplier 21 in FIG. 6 may be omitted and, thus, input pulses will be supplied to all of the storage units CSH, CSM and CSHM by the oscillator 20 at a frequency rate of *f*.

Figure 11:
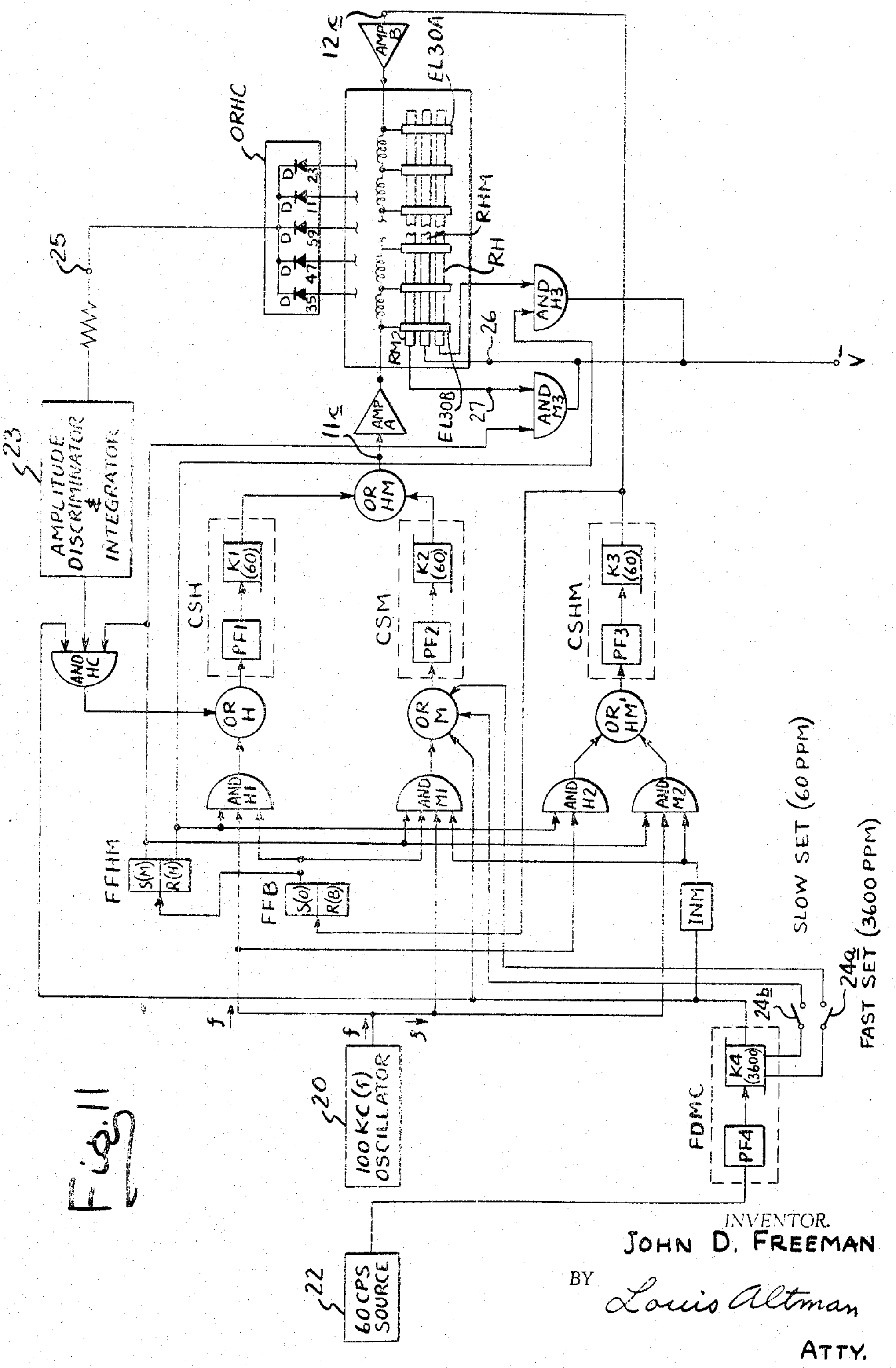
FIG. 11 is a block diagram of a modified version of the solid state clock shown in FIG. 6.

Referring to FIG. 11, the modified solid state clock is illustrated in block form. As may be seen, a third conductive ring RH has been associated with the electroluminescent panels which is connected to the negative potential V through a gate ANDH3. Operation of the gate ANDH3, like operation of the gate ANDM3 associated with the ring RM, is controlled by the flip-flop FFHM. However, the gate ANDH3 is opened when flip-flop FFHM is reset so that the conductive ring RH is connected to the negative potential V and is thus electrically associated with the electroluminescent panels. Conversely, the gate ANDM3 is opened when flip-flop FFHM is set to electrically associate the conductive ring RM with the electroluminescent panels. Thus, it will be apparent that conductive rings RM and RHM are electrically associated with the electroluminescent panels when the flip-flop FFHM is in the set condition and "minute" pulses are being applied to the delay line, whereas the conductive rings RHM and RH are electrically associated with the electroluminescent panels when the flip-flop FFHM is in the reset condition and "hour" pulses are being applied to the delay line. Since two conductive rings are associated with the panels regardless of whether "minute" or "hour" input pulses are being applied to the delay line, it follows that the capacitance and therefore the delay per section for "minute" input pulses and "hour" input pulses can be made the same. Thus, pulses are supplied to all of the storage units CSH, CSM and CSHM by the oscillator 20.

In order that a greater portion of each electroluminescent panel is illuminated in response to the coincidence thereadjacent of "minute" input pulses than is illuminated in response to the coincidence thereadjacent of "hour" input pulses, the lower one third of the electroluminescent panels adjacent the conductive ring RH may be blanked out so as not to be visible. Under such conditions, the upper two thirds of each electroluminescent panel will be illuminated in response to the coincidence of "minute" input pulses thereadjacent, whereas only the middle one third of the panels will be illuminated in response to the coincidence of "hour" input pulses thereadjacent. Thus, the electroluminescent panel illuminated to indicate the position of the minute hand may be visually distinguished from the electroluminescent panel indicating the position of the hour hand.

The operation of the solid state clock illustrated in FIG. 11 is the same as that set forth hereinabove for the solid state clock illustrated in FIG. 6 and, therefore, the operation will not be set forth herein but rather reference may be made to the above description for FIG. 6. The only difference in the operations of the solid state clocks illustrated in FIG. 6 and FIG. 11 will reside in the time periods during which the flip-flops FFB and FFHM are in their set and reset conditions as a result of the omission of the frequency multiplier 21 in FIG. 11. It follows that the time period during which flip-flop FFHM is in the reset condition will be equal to the time period during which this flip-flop is in the set condition. Likewise, the time periods during which flip-flop FFB is in the set and reset conditions when flip-flop FFHM is in the reset condition will be the same as the time periods during which flip-flop FFB is in the set and reset conditions when flip-flop FFHM is in the set condition.

Figure 12:
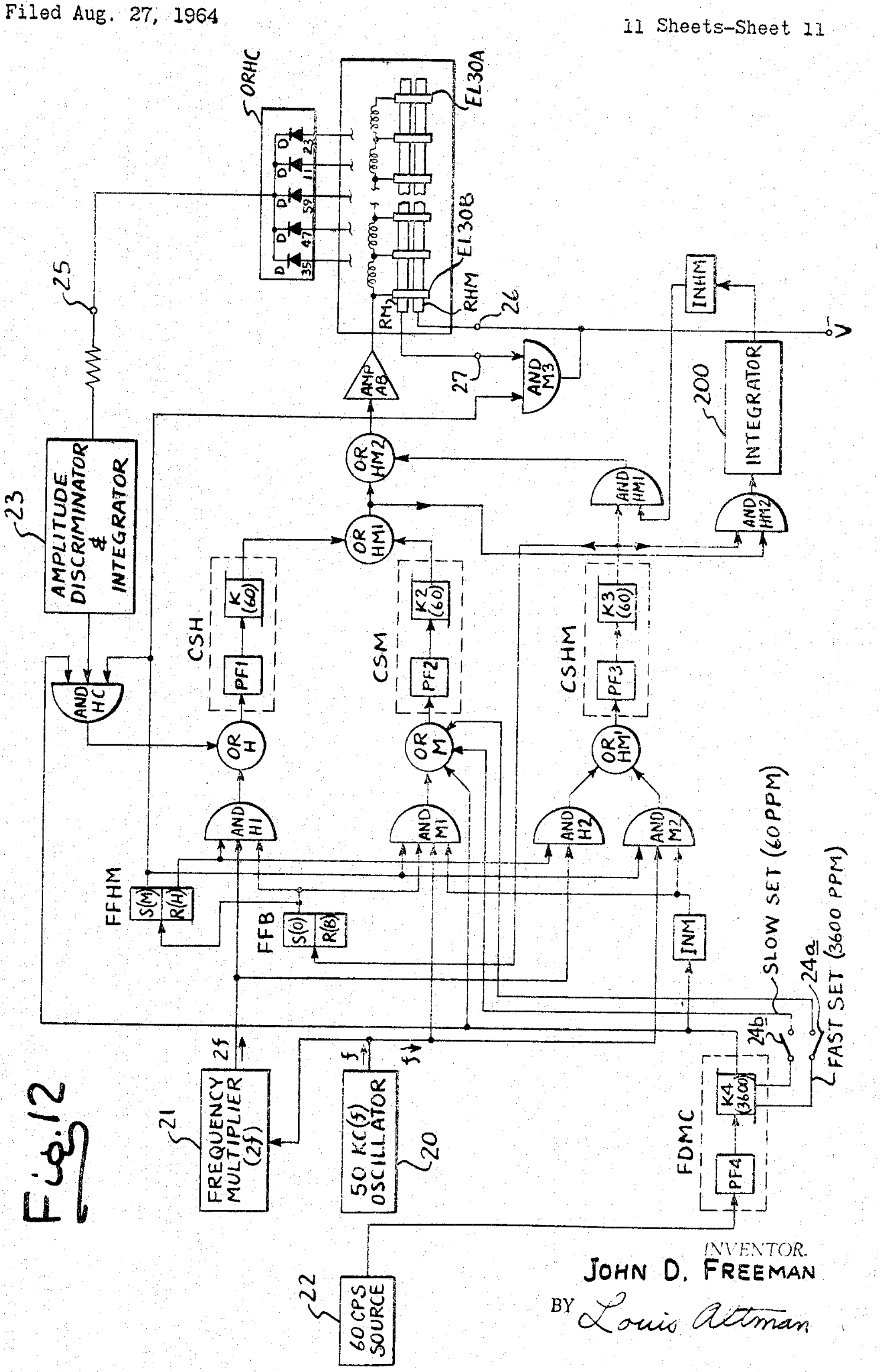
FIG. 12 is a block diagram of another exemplary solid state clock constructed in accordance with the present invention including circuitry for applying pulses to the same end of the delay line of the clock.

Referring to FIG. 12, a block diagram is shown which illustrates the changes required in the block diagram of FIG. 6 for the solid state clock to function with an open-ended delay line, such as that shown in FIG. 2, wherein the pairs of input pulses are applied to the same end of the delay line. As may be seen, the solid state clock in FIG. 12 is the same as the solid state clock in FIG. 6 except for the circuitry which controls the transmission of pulses from the storage units CSH, CSM and CSHM to the delay line.

As will be apparent, for corresponding operation of the same delay line having the same delay per section, the frequency of the oscillator 20 for the arrangement in FIG. 12 must be one half the frequency thereof for the arrangement in FIG. 6. The reduction in frequency is made to compensate for the extended time period required for the input pulses to the delay line to be dissipated in the characteristic impedance thereof. More specifically, the input pulses must travel the length of the delay line in one direction and then travel the length of the delay line in the opposite direction (120 delay line sections) before they are dissipated in the characteristic impedance, whereas, in the arrangement of FIG. 6, the pulses need only travel the length of the delay line in one direction (60 delay line sections). In view of the description of the operation for the delay line in FIG. 6, it will be apparent that, since each pulse applied to the delay line must travel therealong 120 sections rather than 60 sections, the frequency at which pulses are applied to the storage units CSM, CSH and CSHM must be cut in half for the desired delay line operation.

As may be seen, the outputs of the storage units CSH and CSM are connected to the left-hand terminal of the delay line through gate ORHM1, gate ORHM2 and the amplifier AMPAB. The output of the storage unit CSHM is connected to the left-hand terminal of the delay line through gate ANDHM1, gate ORHM2 and the amplifier AMPAB. The gate ANDHM1 is provided for controlling the operation of a selected electroluminescent panel or selected panels when pulses are simultaneously provided by the storage unit CSHM and either the storage unit CSH or storage unit CSHM. If pulses were simultaneously applied to the same end of the delay line by storage unit CSHM and either storage unit CSH or storage unit CSM, it is apparent that the pulses would concurrently run down the delay line and back, causing all of the electroluminescent panels to be illuminated. In the arrangement illustrated in FIG. 12, the gate ANDHM1 is closed, when pulses are simultaneously produced by the storage unit CSHM and either storage unit CSH or the storage unit CSM, to prevent such simultaneous application of pulses to the delay line.

As may be seen, the output of the storage unit CSHM and the output of gate ORHM1 are connected to a gate ANDHM2 so that the gate is open when pulses are simultaneously produced by the storage unit CSHM and either the storage unit CSH or the storage unit CSM. When the gate ANDHM2 is opened, a signal is transmitted therethrough to an integrator 200 which produces an output having a time period equal to four times the total delay period for the delay line. The output of the integrator is transmitted through an inverter INHM to the gate ANDHM1 so that the transmission of pulses from the storage unit CSHM to the delay line through the gate ANDHM1 is controlled by the output of the integrator. When an output signal is provided by the integrator indicating the simultaneous production of pulses by the storage unit CSHM and either the storage unit CSH or the storage unit CSM, the gate ANDHM1 is closed so that the transmission of a pulse from the storage unit CSHM to the delay line is prohibited. Conversely, when no output is provided by the integrator indicating that pulses are not simultaneously applied to the gate ANDHM2, the gate ANDHM1 is open so that pulses from the storage unit CSHM may pass therethrough to the delay line.

Illumination of the end panel $EL_{30B}$, when pulses are simultaneously produced by storage unit CSHM and storage unit CSH or CSM, results from pulses being applied at their normal rates by the storage units CSM and CSH. Each pulse travels up the line and is reflected so that it travels back down the line to coincide with the next repetition of the same pulse adjacent the end panel $EL_{30B}$. Accordingly, under all conditions, the pulses are applied to the same end of the delay line through amplifier AMPAB so that the illumination of the panels is controlled in accordance with the coincidence of one input pulse and the reflection of a previously applied input pulse.

Since the operation of the rest of the circuitry shown in FIG. 12 corresponds to that for the circuitry shown in FIG. 6, reference may be made to the above description for FIG. 6 for such operation.

Though the above-described solid state clocks have been illustrated with means being provided to regulate the illumination of electroluminescent panels only to indicate the positions of the minute and hour hands, it will be obvious to one skilled in the art that additional means, constructed in accordance with the above teachings, may be added for regulating the illumination of electroluminescent panels to indicate the positions of a second hand. Accordingly, the invention is intended to cover means for regulating the illumination of the electroluminescent panels to indicate the positions of the three clock hands, i.e., the second, minute and hour hands. Additionally, though the same electroluminescent panels are utilized for indicating the positions of the clock hands in the illustrated embodiments, separate panels may be utilized for each hand and the present invention is intended to cover the use of separate panels or the same panel for representing the different clock hand positions.

In view of the foregoing, it may be seen that solid state clocks have been provided which utilize a plurality of electroluminescent panels or rods oriented on a clock face at positions corresponding to the positions of the clock hands wherein the panels or rods are selectively illuminated to indicate the positions of the clock hands and thus to indicate the time. Further, it may be seen that a delay line has been provided utilizing electroluminescent panels as conductive elements therein, wherein problems common with the usage of such panels have been eliminated.

I claim as my invention:

1. In a solid state clock, the combination which comprises, a delay line including a plurality of electroluminescent panels positioned in an array on the clock face at intervals corresponding to successive positions of the clock hands, means including only solid state elements associated with the delay line and operative according to a prescribed time function for causing the panels to be selectively and successively illuminated to indicate the succeeding positions of the minute hand, and means including only solid state elements associated with the delay line and operative according to a different prescribed time function for causing the panels to be selectively and successively illuminated to indicate the succeeding positions of the hour hand.

2. In an electronic clock, the combination which comprises, a delay line including a plurality of members capable of illumination which are positioned in an array on the clock face at intervals corresponding to successive positions of the clock hands, means for applying pairs of pulses to the delay line having desired time relationships therebetween which are representative of the desired positions of the clock hands, a member being illuminated upon coincidence of the pulses in a pair thereadjacent, the frequency of application of the pairs of pulses being such that the members appear to remain illuminated throughout the time period during which pulses coincide thereadjacent, and means for altering the time relationships between the application of pulses in the pairs to the delay line so that coincidence thereof occurs at desired times adjacent members representing the succeeding positions of the clock hands.

3. In an electronic clock, the combination which comprises, a delay line including a plurality of members capable of illumination which are positioned on the clock face in an array at intervals corresponding to successive positions of the clock hands, means for producing pairs of pulses having desired timed relationships therebetween which are representative of the desired positions of the clock hands, means for applying the pulses in each pair to the delay line at different times, a member being illuminated when pulses in a pair coincide thereadjacent, the pairs of pulses being applied at a frequency rate such that the members appear to remain illuminated throughout the period during which pulses coincide thereadjacent, and means for altering the time relationship between the production of pulses in the pairs according to prescribed time functions so that coincidence thereof occurs at desired times adjacent members corresponding to the succeeding positions of the clock hands.

4. In a solid state clock, the combination which comprises a lumped parameter delay line including a plurality of electroluminescent panels which function as capactive elements and which are positioned on the clock face in an array at intervals corresponding to successive positions of the clock hands, means for alternately producing pairs of pulses having desired timed relationships therebetween which are representative of the desired positions of the minute and hour hands, means for applying the pulses in each pair to opposite ends of the delay line, an electroluminescent panel being illuminated when the pulses coincide thereadjacent, the pulses being produced at frequency rates such that the electroluminescent panels appear to remain illuminated throughout the time period during which pulses coincide thereadjacent, and means for altering the time relationship between the production of the pulses in the pairs according to prescribed time functions so that coincidence thereof occurs at desired times adjacent electroluminescent panels corresponding to succeeding positions of the clock hands.

5. In a solid state clock, the combination which comprises, a lumped parameter delay line including a plurality of electroluminescent panels which function as capacitive elements and which are positioned on the clock face in an array at intervals corresponding to successive positions of the clock hands, means for alternately producing pairs of pulses having desired time relationships therebetween which are representative of the desired positions of the minute and hour hands, means for applying the pulses in each pair to the same end of the delay line, an electroluminescent panel being illuminated when one of the pulses in a pair and the reflection of the other pulse coincide thereadjacent, the pulses being produced at frequency rates such that the electroluminescent panels appear to remain illuminated throughout the time period during which coincidence occurs thereadjacent, and means for altering the time relationship between the production of the pulses in the pairs according to prescribed time functions so that coincidence thereof occurs at desired times adjacent electroluminescent panels corresponding to succeeding positions of the clock hands.

6. In a solid state clock, the combination which comprises, a lumped parameter delay line including a plurality of electroluminescent panels which function as capacitive elements and which are positioned on the clock face in an array at intervals corresponding to successive positions of the clock hands, means for alternately producing pairs of pulses having desired time relationships therebetween which are representative of the desired positions of the minute and hour hands, means for applying the pulses in each pair to the same end of the delay line, an electroluminescent panel being illuminated when one of the pulses in a pair and the reflection of the other pulse coincide thereadjacent, the pulses being produced at frequency rates such that the electroluminescent panels appear to remain illuminated throughout the time period during which coincidence occurs thereadjacent, means for altering the time relationship between the production of the pulses in the pairs according to prescribed time functions so that coincidence thereof occurs at desired times adjacent electroluminescent panels corresponding to succeeding positions of the clock hands, and means responsive to the simultaneous production of pulses in a pair for preventing the application thereof to the delay line and for causing a panel or panels representative of a desired hand position to be illuminated.

7. In a solid state clock, the combination which comprises, a lumped parameter electromagnetic delay line having a plurality of electroluminescent panels electrically connected therein which function as capacitive elements and which are positioned in an array at intervals corresponding to successive positions of the clock hands, a nonlinear resistive element being connected in series with each electroluminescent panel, a fixed capacitor being connected in parallel with each series arrangement of an electroluminescent panel and a nonlinear resistive element, means for applying pairs of pulses to the delay line having desired time relationships therebetween which are representative of the desired positions of the clock hands and which cause an electroluminescent panel to be illuminated when pulses in a pair coincide thereadjacent, the pairs of pulses being applied at a frequency rate such that the electroluminescent panels appear to remain illuminated throughout the time period during which pulses coincide thereadjacent, and means for altering the time relationship between the application of the pulses in the pairs to the delay line so that coincidence thereof occurs at desired times adjacent electroluminescent panels corresponding to the succeeding positions of the clock hands.

8. In a solid state clock, the combination which comprises, a lumped parameter electromagnetic delay line including a plurality of electroluminescent panels which function as capacitive elements and which are positioned on the face of the clock in an array at minute intervals corresponding to successive positions of the clock hands, means for alternately producing pairs of minute pulses and pairs of hour pulses which are respectively representative of the desired positions of the minute hand and the hour hand, means for applying the pulses in each pair to the delay line so that electroluminescent panels are illuminated to indicate the positions of the minute hand and the hour hand when pulses coincide thereadjacent, the pairs of pulses being produced at frequency rates such that the electroluminescent panels appear to remain illuminated throughout the time period during which pulses coincide thereadjacent, and means for altering the time relationships between the production of the pulses in the minute pairs and between the production of the pulses in the hour pairs according to different time functions so that coincidence between the minute pulses and coincidence between the hour pulses occur at desired times adjacent the next succeeding electroluminescent panels respectively corresponding to the next succeeding position of the minute hand and the hour hand.

9. In a solid state clock, the combination which comprises, a lumped parameter electromagnetic delay line including a plurality of electroluminescent panels which function as capacitive elements and which are positioned on the face of the clock in an array at minute intervals corresponding to successive positions of the clock hands, means for alternately producing pairs of minute pulses and pairs of hour pulses which are respectively representative of the desired positions of the minute hand and the hour hand, means for applying the pulses in each pair to the delay line so that electroluminescent panels are illuminated to indicate the positions of the minute hand and the hour hand when pulses coincide thereadjacent, the pairs of pulses being produced at frequency rates such that the electroluminescent panels appear to remain illuminated throughout the time period during which pulses coincide thereadjacent, and means for altering the time relationships between the production of the pulses in the minute pairs every minute and between the production of the pulses in the hour pairs every twelve minutes so that coincidence between the minute pulses and coincidence between the hour pulses occur at desired times adjacent the next succeeding electroluminescent panels respectively corresponding to the next succeeding position of the minute hand and the hour hand.

10. In a solid state clock, the combination which comprises, a lumped parameter electromagnetic delay line including a plurality of electroluminescent panels which function as capacitive elements and which are positioned on the face of the clock in an array at minute intervals corresponding to successive positions of the clock hands, means for alternately producing pairs of minute pulses and pairs of hour pulses with a prescribed blanking time period existing between the production thereof, the pairs of pulses being respectively representative of the desired positions of the minute hand and the hour hand, means for applying the pulses in each pair to the delay line so that electroluminescent panels are illuminated to indicate the positions of the minute hand and the hour hand when pulses coincide thereadjacent, the pairs of pulses being produced at frequency rates such that the electroluminescent panels appear to remain illuminated throughout the time period during which pulses coincide thereadjacent, means for altering the time relationships between the production of the pulses in the minute pairs every minute so that coincidence between minute pulses occurs adjacent electroluminescent panels corresponding to succeeding positions of the minute hand, and means responsive to coincidence of minute pulses for altering the time relationship between the production of the pulses in the hour pairs every twelve minutes so that coincidence between the hour pulses occurs adjacent electroluminescent panels corresponding to succeeding positions of the hour hand.

11. In a solid state clock, the combination which comprises, a lumped parameter electromagnetic delay line including a plurality of electroluminescent panels which function as capacitive elements and which are positioned on the face of the clock in an array at minute intervals corresponding to successive positions of the clock hands, means for alternately producing pairs of minute pulses and pairs of hour pulses with a prescribed blanking time period existing between the production thereof, the pairs of pulses being respectively representative of the desired positions of the minute hand and the hour hand, means for applying the pulses in each pair to the delay line so that electroluminescent panels are illuminated to indicate the positions of the minute hand and the hour hand when pulses coincide thereadjacent, the pairs of pulses being produced at frequency rates such that the electroluminescent panels appear to remain illuminated throughout the time period during which pulses coincide thereadjacent, means for altering the time relationships between the production of the pulses in the minute pairs every minute so that coincidence between minute pulses occurs adjacent electroluminescent panels corresponding to succeeding positions of the minute hand, means responsive to coincidence of minute pulses for altering the time relationship between the production of the pulses in the hour pairs every twelve minutes so that coincidence between the hour pulses occurs adjacent electroluminescent panels corresponding to succeeding positions of the hour hand, and means for altering the time relationship between the production of the minute pulses at a selected rate whereby selected panels are illuminated and the clock is preset to indicate the correct time.

12. In a solid state clock, the combination which comprises, a lumped parameter electromagnetic delay line including a plurality of electroluminescent panels which function as capacitive elements and which are positioned on the face of the clock in an array at minute intervals corresponding to successive positions of the clock hands, means for producing pairs of minute pulses which are representative of the desired positions of the minute hand, means for applying the minute pulses in each pair to the delay line so that an electroluminescent panel is illuminated to indicate the position of the minute hand when the pulses coincide thereadjacent, the minute pulses being applied at a frequency rate such that an electroluminescent panel appears to remain illuminated throughout the time period during which coincidence occurs thereadjacent, means for producing pairs of hour pulses which are representative of the desired positions of the hour hand, means for applying the hour pulses in each pair to the delay line so that an electroluminescent panel is illuminated to indicate the position of the hour hand when the pulses coincide thereadjacent, the hour pulses being applied at a frequency rate such that an electroluminescent panel appears to remain illuminated throughout the time period during which pulses coincide thereadjacent, means responsive to the production of a pair of pulses for preventing the production of a subsequent pair of pulses for a desired blanking time period, and means for altering the time relationships between the production of the pulses in the minute pairs and between the production of the pulses in the hour pairs so that coincidence between the minute pulses and coincidence between the hour pulses occur at desired times adjacent the next succeeding electroluminescent panels respectively corresponding to the next succeeding position of the minute hand and the hour hand.

13. In a solid state clock, the combination which comprises, a lumped parameter electromagnetic delay line including a plurality of electroluminescent panels which function as capacitive elements and are positioned on the face of the clock in an array at minute intervals corresponding to successive positions of the clock hands, means for producing pairs of minute pulses which are representative of the desired positions of the minute hand, means for causing each entire electroluminescent panel to be included in the delay line when minute pulses are applied thereto, means for applying the minute pulses in each pair to the delay line so that an entire electroluminescent panel is illuminated to indicate the position of the minute hand when the pulses coincide thereadjacent, the minute pulses being applied at a frequency rate such that an electroluminescent panel appears to remain illuminated throughout the time period during which pulses coincide thereadjacent, means for producing pairs of hour pulses which are representative of the desired positions of the hour hand, means for causing only a portion of each electroluminescent panel to be included in the delay line when hour pulses are applied thereto, means for applying the hour pulses in each pair to the delay line so that a portion of an electroluminescent panel is illuminated to indicate the position of the hour hand when the pulses coincide thereadjacent, the hour pulses being applied at a frequency rate such that an electroluminescent panel appears to remain illuminated throughout the time period during which pulses coincide thereadjacent, and means for altering the time relationships between the production of the pulses in the minute pairs and between the production of the pulses in the hour pairs so that coincidence between minute pulses and coincidence between hour pulses occur at desired times adjacent the next succeeding electroluminescent panels respectively corresponding to the next succeeding position of the minute hand and the hour hand.

14. In a solid state clock, the combination which comprises, a lumped parameter electromagnetic delay line including a plurality of electroluminescent panels electrically connected together by inductances which function as plates of capacitive elements and which are positioned on the face of the clock in an array at minute intervals corresponding to succeeding positions of the clock hands, a pair of conductive members mounted adjacent the electroluminescent panels in overlapping relationship which function as the other plates of the capacitive elements, means for producing pairs of minute pulses which are representative of the desired positions of the minute hand and for electrically associating both conductive members with the electroluminescent panels, means for applying the minute pulses in each pair to the delay line so that an entire electroluminescent panel is illuminated to indicate the position of the minute hand when pulses coincide thereadjacent, the minute pulses being applied at a frequency rate such that an electroluminescent panel appears to remain illuminated throughout the time period during which minute pulses coincide thereadjacent, means for producing pairs of hour pulses which are representative of the desired positions of the hour hand and for electrically associating only one of the conductive members with the electroluminescent panels, means for applying the hour pulses in each pair to the delay line so that a portion of an electroluminescent panel is illuminated to indicate the position of the hour hand when pulses coincide thereadjacent, the hour pulses being applied at a frequency rate such that the portion of an electroluminescent panel appears to remain illuminated throughout the time period during which hour pulses coincide thereadjacent, and means for altering the time relationships between the production of the pulses in the minute pairs and between the production of the pulses in the hour pairs so that coincidence between the minute pulses and coincidence between the hour pulses occur at desired times adjacent the next succeeding electroluminescent panels respectively corresponding to the next succeeding position of the minute hand and the hour hand.

15. In a solid state clock, the combination which comprises, a lumped parameter electromagnetic delay line including a plurality of electroluminescent panels electrically connected together by inductances which function as plates of capacitive elements and which are positioned on the face of the clock in an array at minute intervals corresponding to succeeding positions of the clock hands, three conductive members mounted adjacent the electroluminescent panels in overlapping relationship which function as the other plates of the capacitive elements, means for producing pairs of minute pulses which are representative of the desired positions of the minute hand and for electrically associating a pair of conductive members with the electroluminescent panels, means for applying the minute pulses in each pair to the delay line so that a desired portion of an electroluminescent panel is illuminated to indicate the position of the minute hand when pulses coincide thereadjacent, the minute pulses being applied at a frequency rate such that an electroluminescent panel appears to remain illuminated throughout the time period during which minute pulses coincide thereadjacent, means for producing pairs of hour pulses which are representative of the desired positions of the hour hand and for electrically associating a different pair of conductive members with the electroluminescent panels, means for applying the hour pulses in each pair to the delay line so that a different desired portion of an electroluminescent panel is illuminated to indicate the position of the hour hand when pulses coincide thereadjacent, the hour pulses being applied at a frequency rate such that the portion of an electroluminescent panel appears to remain illuminated throughout the time period during which hour pulses coincide thereadjacent, and means for altering the time relationships between the production of the pulses in the minute pair and between the production of the pulses in the hour pair so that coincidence between the minute pulses and coincidence between the hour pulses occur at desired times adjacent the next succeeding electroluminescent panels respectively corresponding to the next succeeding position of the minute hand and the hour hand.

16. In a solid state clock, the combination which comprises, a circular, ring-like magnetic core, a winding wound about the magnetic core so as to be electromagnetically associated therewith, a plurality of electroluminescent panels electrically connected to the winding at equally spaced circumferential positions around the magnetic core such that succeeding electroluminescent panels are electrically connected together by inductances having the same values, each electroluminescent panel functioning as one plate of a capacitive element and the electroluminescent panels being positioned on the face of the clock in a circular array corresponding to the minute interval positions of the clock hands, a pair of circular conductive rings mounted adjacent the electroluminescent panels in overlapping relationship which function as the other plates of the capacitive elements, means for alternately producing minute pulses and hour pulses which are respectively representative of the desired positions of the minute hand and the hour hand and for alternately and electrically associating both circular rings and only one circular ring with the electroluminescent panels, means for applying the pulses in each pair to the delay line so that an electroluminescent panel is illuminated to indicate the position of the minute hand and a portion of an electroluminescent panel is illuminated to indicate the position of the hour hand when pulses in a pair coincide thereadjacent, the pulses being produced at frequency rates such that an electroluminescent panel and the portion of an electroluminescent panel appear to remain illuminated throughout the time period during which pulses coincide thereadjacent, and means for altering the time relationships between the production of pulses in the minute pairs and between the production of pulses in the hour pairs so that coincidence between minute pulses and coincidence between hour pulses occur at desired times adjacent the next succeeding electroluminescent panels respectively corresponding to the next succeeding position of the minute hand and the hour hand.

17. An electronic clock comprising the combination of a clock face including a plurality of time indicating members capable of illumination and positioned in an array at intervals corresponding to successive positions of the clock hands, power supply means operatively associated with said indicating members for supplying power to said indicating members to illuminate the same, a source of timed electrical pulses for controlling the time of illumination of said indicating members, and means interconnecting said indicating members to form a delay line responsive to said pulses for operatively connecting said power supply means to successive indicating members according to the time relationship of said pulses so that said indicating members are successively illuminated to indicate the successive positions of the clock hands.

(References on following page)

References Cited by the Examiner

UNITED STATES PATENTS

| | | | |
|---|---|---|---|
| 863,287 | 8/1907 | Kuntz | 250—72 |
| 1,096,779 | 5/1914 | Clement | 58—50 |
| 2,542,021 | 2/1951 | Fox | 58—50 |
| 2,827,233 | 3/1958 | Johnson | 340—347 |
| 2,900,574 | 8/1959 | Kazan | 315—169 |
| 3,054,929 | 9/1962 | Livingston | 315—169 |
| 3,066,287 | 11/1962 | Matarese | 340—347 |
| 3,194,003 | 7/1965 | Polin | 58—50 |

FOREIGN PATENTS

| | | |
|---|---|---|
| 1,281,577 | 12/1961 | France. |

RICHARD B. WILKINSON, *Primary Examiner.*

GERALD F. BAKER, *Assistant Examiner.*